US012026421B2

(12) United States Patent
Wu

(10) Patent No.: US 12,026,421 B2
(45) Date of Patent: Jul. 2, 2024

(54) SCREEN SHARING METHOD, APPARATUS, AND DEVICE, AND STORAGE MEDIUM

(71) Applicant: TENCENT TECHNOLOGY (SHENZHEN) COMPANY LIMITED, Guangdong (CN)

(72) Inventor: Qiliang Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/977,715

(22) Filed: Oct. 31, 2022

(65) Prior Publication Data

US 2023/0049197 A1    Feb. 16, 2023

Related U.S. Application Data

(63) Continuation of application No. PCT/CN2021/100311, filed on Jun. 16, 2021.

(30) Foreign Application Priority Data

Aug. 3, 2020 (CN) .................. 202010768300.X

(51) Int. Cl.
    *G06F 3/14*          (2006.01)
    *G06F 3/0488*      (2022.01)
    *G06F 3/16*          (2006.01)

(52) U.S. Cl.
    CPC ............ *G06F 3/1454* (2013.01); *G06F 3/167* (2013.01); *G06F 3/0488* (2013.01)

(58) Field of Classification Search
    CPC ...... G06F 3/1454; G06F 3/167; G06F 3/0488; G06F 3/1462; G06F 3/04886;
         (Continued)

(56) References Cited

U.S. PATENT DOCUMENTS 5,442,788 A *   8/1995   Bier .................... G06F 9/542
                                                   715/755
10,120,988 B2 *   11/2018   DeWeese ................ H04L 67/10
         (Continued)

FOREIGN PATENT DOCUMENTS

CN       104221047 A     12/2014
CN       106716954 A     5/2017
         (Continued)

OTHER PUBLICATIONS

International Search Report for PCT/CN2021100311 dated, Sep. 15, 2021 (PCT/ISA/210).

(Continued)

*Primary Examiner* — Benyam Ketema
(74) *Attorney, Agent, or Firm* — Sughrue Mion, PLLC

(57) ABSTRACT

A screen sharing method, apparatus, and device, and a storage medium. The screen sharing method includes: displaying a shared screen picture in a process of performing screen sharing among N terminals, N being an integer greater than 1, the first terminal being a terminal in the N terminals, and the shared screen picture being synchronously displayed in the N terminals; and highlighting, in a case that a target position in the screen picture displayed in a terminal of the N terminals is triggered, the target position in a screen picture of the first terminal, the target position being a position in the screen picture.

18 Claims, 13 Drawing Sheets

(58) Field of Classification Search
CPC .... G06F 3/0482; G06F 3/04817; G06F 9/452; G09G 2354/00; G09G 2370/022
See application file for complete search history.

(56) References Cited

U.S. PATENT DOCUMENTS

| | | | | |
|---|---|---|---|---|
| 10,789,035 | B2* | 9/2020 | Tsubone | H04N 1/32144 |
| 11,146,601 | B1* | 10/2021 | Silverstein | H04L 67/10 |
| 11,159,590 | B1* | 10/2021 | Sexauer | H04N 7/15 |
| 11,330,026 | B1* | 5/2022 | Han | H04L 65/4015 |
| 11,582,424 | B1* | 2/2023 | Kasaba | G06V 40/28 |
| 2006/0031779 | A1* | 2/2006 | Theurer | G06F 3/1454 |
| | | | | 715/781 |
| 2008/0068449 | A1* | 3/2008 | Wu | H04N 7/152 |
| | | | | 348/14.09 |
| 2009/0015661 | A1* | 1/2009 | King | H04N 7/152 |
| | | | | 348/14.09 |
| 2010/0085419 | A1* | 4/2010 | Goyal | H04N 7/147 |
| | | | | 348/E7.083 |
| 2010/0192107 | A1* | 7/2010 | Takahashi | G06Q 10/10 |
| | | | | 715/856 |
| 2010/0199191 | A1* | 8/2010 | Takahashi | G06F 3/0481 |
| | | | | 715/741 |
| 2010/0283829 | A1* | 11/2010 | De Beer | H04M 3/56 |
| | | | | 348/14.09 |
| 2011/0107238 | A1* | 5/2011 | Liu | H04N 7/15 |
| | | | | 715/756 |
| 2011/0283203 | A1* | 11/2011 | Periyannan | H04L 12/1827 |
| | | | | 715/753 |
| 2014/0118314 | A1* | 5/2014 | Black | G06F 3/04842 |
| | | | | 345/179 |
| 2014/0298205 | A1* | 10/2014 | Oike | H04L 65/4038 |
| | | | | 715/753 |
| 2015/0033149 | A1* | 1/2015 | Kuchoor | H04N 21/4782 |
| | | | | 715/753 |
| 2015/0033292 | A1* | 1/2015 | Nguyen | H04L 67/568 |
| | | | | 709/219 |
| 2015/0120817 | A1* | 4/2015 | Jeong | H04L 67/10 |
| | | | | 709/203 |
| 2015/0149195 | A1* | 5/2015 | Rose | G16H 30/20 |
| | | | | 705/2 |
| 2015/0229996 | A1* | 8/2015 | Jo | H04N 21/84 |
| | | | | 725/37 |
| 2015/0281644 | A1* | 10/2015 | Arai | H04N 7/147 |
| | | | | 348/14.07 |
| 2015/0304484 | A1* | 10/2015 | Halmstad | H04W 48/02 |
| | | | | 455/419 |
| 2016/0011845 | A1* | 1/2016 | Kuchoor | G06F 40/169 |
| | | | | 715/753 |
| 2016/0072861 | A1* | 3/2016 | Woolsey | H04W 4/14 |
| | | | | 455/414.1 |
| 2016/0072863 | A1* | 3/2016 | Wu | H04L 65/1089 |
| | | | | 715/753 |
| 2016/0080441 | A1* | 3/2016 | Hong | H04L 65/4015 |
| | | | | 709/204 |
| 2016/0094504 | A1* | 3/2016 | Cinar | G06F 3/1454 |
| | | | | 715/752 |
| 2016/0321025 | A1* | 11/2016 | Ikeda | G06F 3/1454 |
| 2018/0113845 | A1* | 4/2018 | Aggarwal | H04L 65/403 |
| 2020/0120149 | A1* | 4/2020 | Park | H04L 65/4015 |
| 2020/0286272 | A1* | 9/2020 | Korhonen | G06T 11/60 |
| 2020/0287947 | A1* | 9/2020 | Korhonen | H04N 21/4312 |
| 2021/0019982 | A1* | 1/2021 | Todd | H04N 21/2343 |
| 2021/0097293 | A1* | 4/2021 | Avrionov | G06F 3/04842 |
| 2021/0352118 | A1* | 11/2021 | Ahn | H04L 65/762 |
| 2022/0365606 | A1* | 11/2022 | Hinckley | G06F 1/1684 |
| 2023/0244434 | A1* | 8/2023 | Weiss | G06F 3/1454 |
| | | | | 715/753 |
| 2023/0297961 | A1* | 9/2023 | Gupta | H04L 12/1822 |
| | | | | 705/301 |
| 2023/0298240 | A1* | 9/2023 | Hayata | G06F 3/16 |
| | | | | 345/473 |
| 2023/0299988 | A1* | 9/2023 | Jin | G06F 3/04815 |
| | | | | 715/753 |

FOREIGN PATENT DOCUMENTS

| | | |
|---|---|---|
| CN | 106790547 A | 5/2017 |
| CN | 107004182 A | 8/2017 |
| CN | 110806846 A | 2/2020 |
| CN | 111417028 A | 7/2020 |
| CN | 111427528 A | 7/2020 |
| CN | 111880695 A | 11/2020 |

OTHER PUBLICATIONS

Written Opinion of the International Searching Authority for PCT/CN2021/100311 dated, Sep. 15, 2021 (PCT/ISA/237).

* cited by examiner

US 12,026,421 B2

SCREEN SHARING METHOD, APPARATUS, AND DEVICE, AND STORAGE MEDIUM

CROSS-REFERENCE TO RELATED APPLICATION(S)

This application is a continuation application of International Application No. PCT/CN2021/100311, filed on Jun. 16, 2021, which claims priority to Chinese Patent Application No. 202010768300.X, filed with the China National Intellectual Property Administration on Aug. 3, 2020, the disclosures of which are incorporated by reference in their entireties.

FIELD

The present disclosure relates to the field of Internet technologies, specifically, to the field of screen sharing technologies, and in particular, to a screen sharing method, a screen sharing apparatus, a screen sharing device, and a computer-readable storage medium.

BACKGROUND

A screen sharing technology refers to a technology of sharing a captured screen picture on a terminal (such as, a mobile phone or a computer) with another or more terminals (such as, a mobile phone and a computer) for display. With the development of Internet technologies, the screen sharing technology has been widely used in fields such as network conferences and network education. Common application scenarios include: a teacher sharing a screen picture of a teacher terminal with student terminals through the screen sharing technology, a conference host sharing a screen picture of a host terminal with participant terminals through the screen sharing technology, or the like.

SUMMARY

An embodiment of the disclosure may provide a screen sharing method, performed by a screen sharing system. The screen sharing system includes N terminals participating in screen sharing, and the screen sharing method includes: synchronously displaying a shared screen picture in the N terminals in a process of performing screen sharing among the N terminals, N being an integer greater than 1; and highlighting, in a case that a target position in the screen picture displayed in any terminal of the N terminals is triggered, the target position in the N terminals, the target position being any position in the screen picture.

According to another aspect, an embodiment of the disclosure may provide a screen sharing method, including: displaying a shared screen picture in a process of performing screen sharing among N terminals, N being an integer greater than 1, the first terminal being any terminal in the N terminals, and the shared screen picture being synchronously displayed in the N terminals; and highlighting, in a case that a target position in the screen picture displayed in any terminal of the N terminals is triggered, the target position in a screen picture of the first terminal.

According to another aspect, an embodiment of the disclosure may provide a screen sharing system, including: a display unit, configured to display a shared screen picture in a process of performing screen sharing among N terminals, N being an integer greater than 1 and the shared screen picture being synchronously displayed in the N terminals; and a processing unit, configured to highlight, in a case that a target position in the screen picture displayed in any terminal of the N terminals is triggered, the target position in a screen picture of a first terminal, the target position being any position in the screen picture and the terminal and the first terminal being different terminals.

According to another aspect, an embodiment of the disclosure may provide a screen sharing device, including: a processor, suitable for implementing computer instructions; and a non-transitory computer-readable storage medium, storing computer instructions, the computer instructions being suitable for being loaded by the processor to perform the above screen sharing method.

According to another aspect, an embodiment of the disclosure may provide a non-transitory computer-readable storage medium, storing computer instructions, the computer instructions, when read and executed by a processor of a computer device, causing the computer device to perform the above screen sharing method. According to another aspect, an embodiment of the disclosure provides a computer program product or computer program, including computer instructions, the computer instructions being stored in a computer-readable storage medium. A processor of a computer device reads the computer instructions from the computer-readable storage medium and executes the computer instruction, to cause the computer device to perform the above screen sharing method.

DESCRIPTION OF EMBODIMENTS

Figure 1:
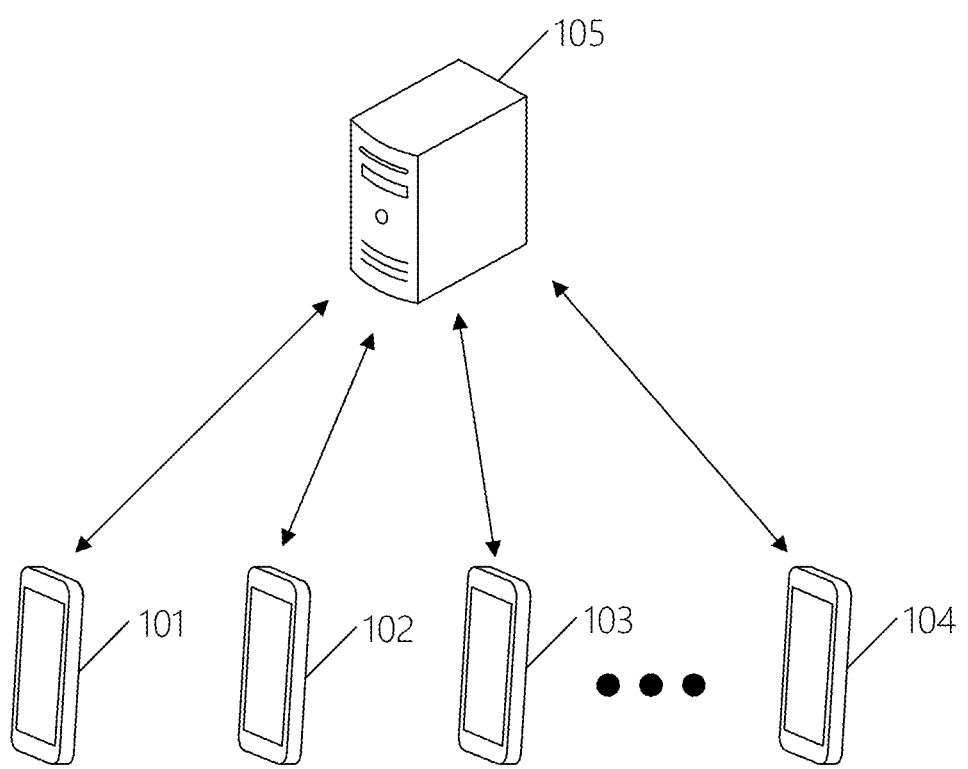
FIG. 1 is a schematic diagram of an architecture of a screen sharing system according to some embodiments.

The present disclosure relates to a screen sharing technology, and the screen sharing technology refers to a technology of sharing a captured screen picture on a terminal (such as, a mobile phone or a computer) with another or more terminals (such as, a mobile phone and a computer) for display. A principle of the screen sharing technology is briefly described below with reference to a screen sharing system shown in FIG. 1. FIG. 1 is a schematic diagram of an architecture of a screen sharing system according to some embodiments. As shown in FIG. 1, the screen sharing system includes N terminals (including N terminals such as, a first terminal 101, a second terminal 102, a third terminal 103, and an $N^{th}$ terminal 104) and a server 105, where N is an integer greater than 1. Any terminal of the N terminals (such as, the first terminal 101, the second terminal 102, the third terminal 103, or the $N^{th}$ terminal 104) may be a smartphone, a tablet computer, a laptop computer, a desktop computer, a smart speaker, a smart watch, or the like, but not limited to thereto. The server 105 may be an independent physical server, or may be a server cluster including a plurality of physical servers or a distributed system, or may be a cloud server providing a cloud computing service. The N terminals and the server may be directly or indirectly connected in a wired communication or wireless communication manner. This is not limited thereto.

In the screen sharing system formed by the N terminals and the server 105, by using an example in which the first terminal 101 performs screen sharing with other terminals except the first terminal 101 in the N terminals. The term "other terminals" is not limited to "all of the other terminals" but may also be "some of the other terminals". The principle of the screen sharing technology is as follows: (1) The first terminal captures a screen picture of the first terminal through a photographing apparatus built in the first terminal, that is, the screen picture of the first terminal is a picture obtained by photographing a screen of the first terminal. Content included in the screen picture is content displayed in the screen when the screen is photographed. For example, content included in the screen picture of the first terminal is a document displayed in the screen of the first terminal when the screen of the first terminal is photographed, such as, a PowerPoint (PPT) presentation document, or a document with a portable document format (PDF). In another example, the content included in the first terminal may also be a web page displayed in the screen of the first terminal when the screen of the first terminal is photographed. This is not limited thereto. (2) The first terminal processes the captured screen picture. For example, the first terminal adds a watermark in the screen picture, or the first terminal changes a document format in the screen picture. (3) The first terminal compresses and encodes the processed screen picture. (4) The first terminal transmits the encoded screen picture to the server. (5) The server distributes the encoded screen picture to the other terminals except the first terminal in the N terminals. (6) The other terminals except the first terminal in the N terminals decode the encoded screen picture after receiving the encoded screen picture, and respectively display the encoded screen picture in the terminals. In an example embodiment, the first terminal may also directly transmit the captured screen picture to the server. The server processes the captured screen picture, compresses and encodes the processed screen picture, and then distributes the encoded screen picture to the other terminals except the first terminal in the N terminals. In an example embodiment, the first terminal may also directly distribute the encoded screen picture to the other terminals except the first terminal in the N terminals, without processing and transfer of the server. It can be seen that, the screen picture of the first terminal is shared with the other terminals except the first terminal for display, so that the screen picture of the first terminal is shared with the other terminals in real time. The server may participate in the screen sharing process. When terminals participating in screen sharing do not have a capability of processing and storing a large quantity of screen pictures, the server may provide the terminals with the capability of processing and storing the screen pictures, which is conducive to improving the overall processing efficiency of the screen sharing system. When the terminals participating in screen sharing have the capability of processing and storing the large quantity of screen pictures, the server may not be used, and the terminals participating in screen sharing may directly interact, which can effectively reduce a hardware cost during running of the screen sharing system.

Based on the above description, an embodiment of the disclosure provides a screen sharing solution. The screen sharing solution bases on the screen sharing system shown in FIG. 1 and the working principle of the screen sharing technology. The screen sharing solution is specifically as follows:

(1) A shared screen picture is synchronously displayed in N terminals in a process of performing screen sharing among the N terminals, where N is an integer greater than 1.

Figure 2A:
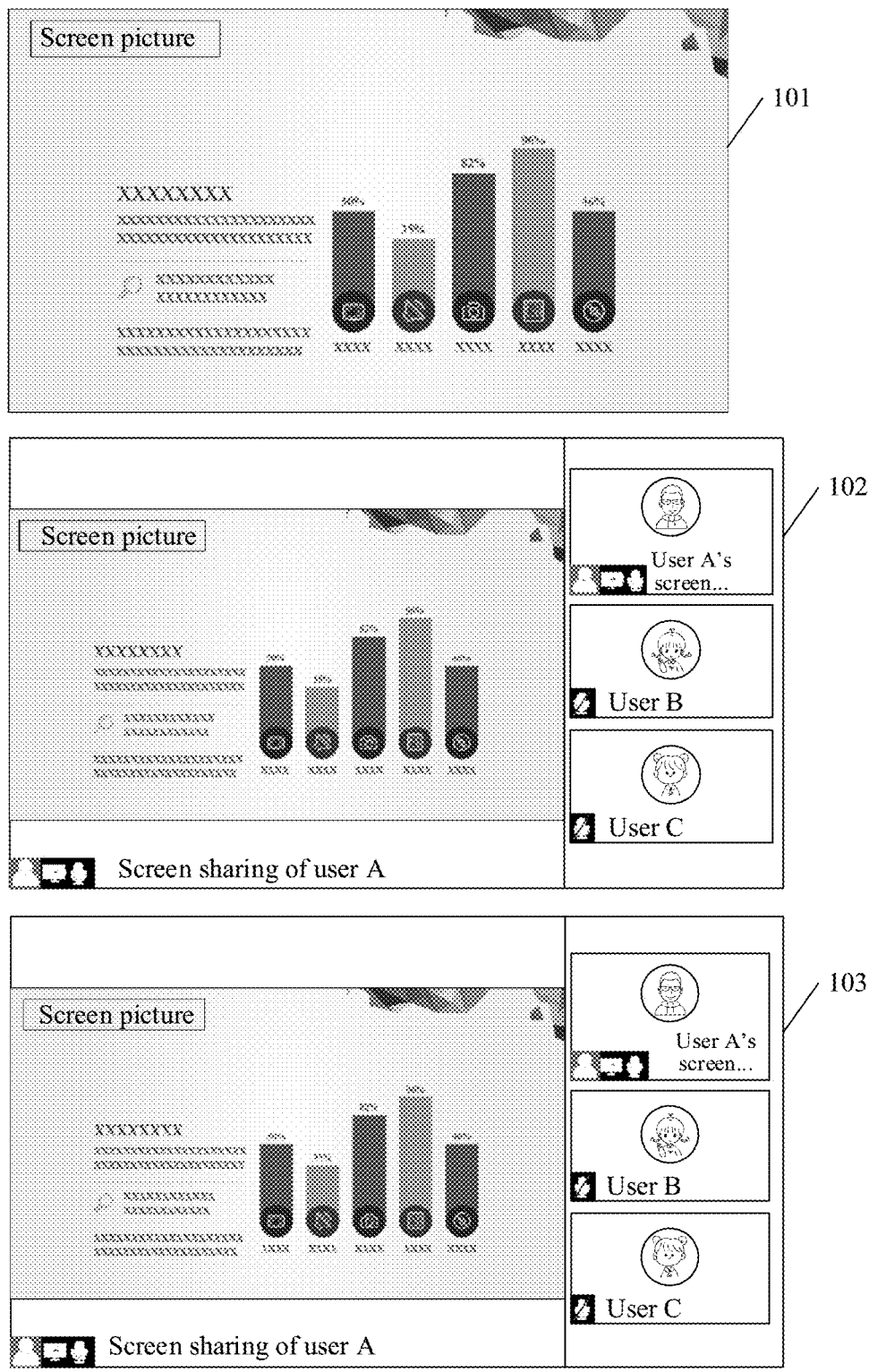
FIG. 2A is a schematic diagram of a screen sharing process according to some embodiments.

Specifically, a social session may be performed among the N terminals, for example, the N terminals participate in a same conference for a social session, or the N terminals participate in a same instant messaging group or social group for a social session. During the social session of the N terminals, the N terminals may perform screen sharing. An example in which the first terminal performs screen sharing with other terminals except the first terminal in the N terminals is used. In a process in which the first terminal performs screen sharing with the other terminals except the first terminal in the N terminals, a screen picture of the first terminal is synchronously displayed in the N terminals, and the screen picture of the first terminal is a picture obtained by photographing a screen of the first terminal. The example in which the first terminal performs screen sharing with the other terminals except the first terminal in the N terminals is used for description in this embodiment. In another application scenario, each of the terminals participating in the social session can initiate screen sharing. For example, the second terminal performs screen sharing with other terminals except the second terminal in the N terminals, the third terminal performs screen sharing with other terminals except the third terminal in the N terminals, or the $N^{th}$ terminal performs screen sharing with other terminals except the $N^{th}$ terminal in the N terminals. That is, any terminal participating in screen sharing can initiate screen sharing. This is not limited in this embodiment of the disclosure. FIG. 2A is a schematic diagram of a screen sharing process according to some embodiments. As shown in FIG. 2A, by using an example in which the first terminal 101 performs screen sharing with the second terminal 102 and the third terminal 103, the first terminal 101 is a terminal used by a terminal user A, the second terminal 102 is a terminal used by a terminal user B, and the third terminal 103 is a terminal used by a terminal user C. The terminal user A shares a screen picture of the first terminal 101 with the second terminal 102 and the third terminal 103 through the first terminal 101, and the second terminal 102 and the third terminal 103 synchronously display the screen picture of the first terminal 101 shared by the first terminal 101.

(2) In a case that a target position in the screen picture is triggered, the target position is highlighted in the N terminals.

Specifically, the target position displayed in the screen picture of the terminals participating in the social session may be triggered. In a case that the target position in the screen picture is triggered (for example, a terminal user clicks the target position in the shared screen picture displayed in a terminal, the terminal user long presses the target position in the shared screen picture displayed in the terminal, or the terminal user double-clicks the target position in the shared screen picture displayed in the terminal), the terminals participating in the social session respectively highlight the target position in respective screen pictures. The target position herein is any position in the shared screen picture. In an example, each of the terminals participating in the social session may trigger the target position in the shared screen picture. For example, the first terminal 101 may trigger the target position in the shared screen picture, or the second terminal 102 may trigger the target position in the shared screen picture. This is not limited thereto.

In an example embodiment, the highlighting the target position in the N terminals may include the following cases.

(1) Display content at the target position in the screen picture as a designated color in the N terminals. In an implementation, the content at the target position may be a blank area displayed at the target position in the screen picture. The blank area does not include any type of content such as a text and a picture. A shape of the area may include, but is not limited to, a circle, a square, a triangle, a diamond, or the like. In another implementation, the content at the target position may be content displayed at the target position in the screen picture. For example, if the screen picture is a PPT document on a page, the content at the target position is content, such as a text and a picture, displayed at the target position in the PPT document on the page. In an implementation, the target position in the screen picture may be triggered by any terminal of the N terminals. In a case that the target position in the screen picture is triggered by any terminal of the N terminals, the content at the target position in the screen picture is displayed as a first target color in the N terminals. In another implementation, the target position in the screen picture may be triggered by a plurality of terminals in the N terminals. In a case that the target position in the screen picture is triggered by the plurality of terminals in the N terminals, a plurality of triggered target positions are differently displayed in the screen picture displayed in the N terminals. An example in which the first terminal 101 and the second terminal 102 trigger the plurality of target positions in the screen picture is used. In a case that a first target position in the screen picture is triggered by the first terminal 101, content at the first target position in the screen picture is displayed as a first target color in the N terminals. In a case that a second target position in the screen picture is triggered by the second terminal, content at the second target position in the screen picture is displayed as a second target color in the N terminals.

(2) Display content at the target position in the screen picture as designated brightness in the N terminals. In an implementation, the target position in the screen picture may be triggered by any terminal of the N terminals. In a case that the target position in the screen picture is triggered by any terminal of the N terminals, the content at the target position in the screen picture is displayed as first target brightness in the N terminals. In another implementation, the target position in the screen picture may be triggered by a plurality of terminals in the N terminals. In a case that the target position in the screen picture is triggered by the plurality of terminals in the N terminals, a plurality of triggered target positions are differently displayed in the screen picture displayed in the N terminals. An example in which the first terminal 101 and the second terminal 102 trigger the plurality of target positions in the screen picture is used. In a case that a first target position in the screen picture is triggered by the first terminal 101, content at the first target position in the screen picture is displayed as first target brightness in the N terminals. In a case that a second target position in the screen picture is triggered by the second terminal 102, content at the second target position in the screen picture is displayed as second target brightness in the N terminals.

(3) Display information of a trigger at the target position in the screen picture displayed in the N terminals. The trigger is a user corresponding to the terminal that triggers the target position. Attribute information of the trigger may include at least one of the following: an avatar, a user name, gender, a job, and an address of the user.

(4) Magnify and display content at the target position in the screen picture in the N terminals. In an implementation, content of a designated area at the target position in the screen picture may be magnified and displayed in the N terminals, and a size of the designated area may be adjusted. The designated area may include any of the following: a circular area, a square area, a triangular area, or a diamond-shaped area.

(5) Display a designated icon at the target position in the screen picture displayed in the N terminals. The designated icon may include any of the following: an emoticon, a graphic icon, or a pattern icon. In an implementation, the target position in the screen picture may be triggered by any terminal of the N terminals. In a case that the target position in the screen picture is triggered by any terminal of the N terminals, a first icon is displayed at the target position in the screen picture displayed in the N terminals. In another implementation, the target position in the screen picture may be triggered by a plurality of terminals in the N terminals. In a case that the target position in the screen picture is triggered by the plurality of terminals in the N terminals, a plurality of triggered target positions are differently displayed in the screen picture displayed in the N terminals. An example in which the first terminal 101 and the second terminal 102 trigger the screen picture is used. In a case that a first target position in the screen picture is triggered by the first terminal 101, a first icon is displayed at the first target position in the screen picture displayed in the N terminals. In a case that a second target position in the screen picture is triggered by the second terminal 102, a second icon is displayed at the second target position in the screen picture displayed in the N terminals.

The above cases of the highlighting the target position are all examples, and other cases may exist. For example, the content at the target position in the screen picture is displayed in a designated content format (such as a designated font) in the N terminals. In addition, the above cases of the highlighting the target position may be combined. For example, the content at the target position in the screen picture is displayed as the designated color in the N terminals, and the information of the trigger is displayed at the target position of the screen picture displayed in the N terminals. Alternatively, the content at the target position in the screen picture is displayed as the designated brightness in the N terminals, and the information of the trigger is displayed at the target position of the screen picture displayed in the N terminals. This is not thereto. By highlighting the target position in the screen picture, the terminals participating in the social session can intuitively check the triggered target position in the screen picture, thereby realizing effective interaction in the screen sharing process, and having a better screen sharing effect among the terminals. Moreover, manners of highlighting the triggered target position in the screen picture are flexible and various, thereby improving the interactivity of screen sharing among the terminals.

Figure 2B:
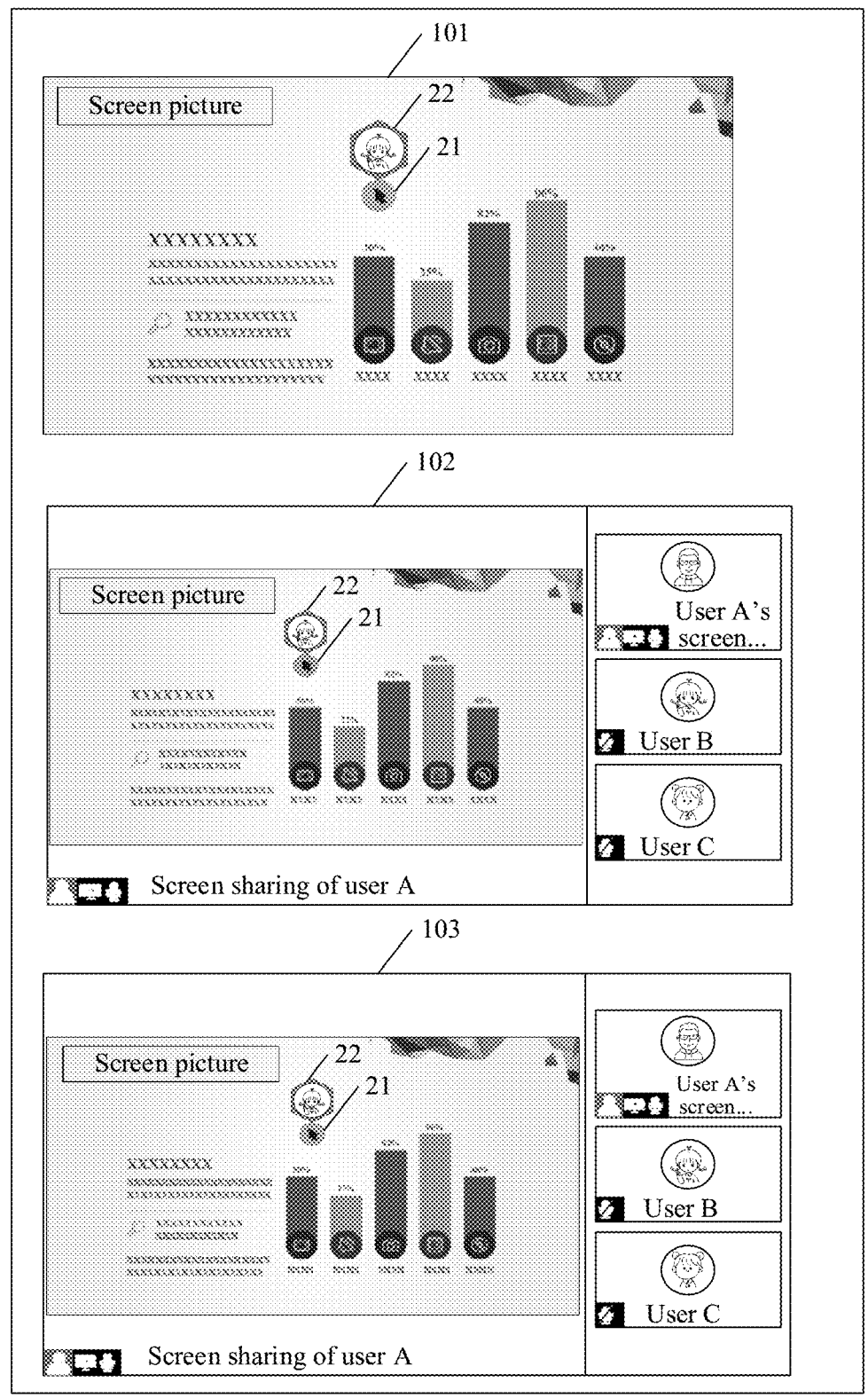
FIG. 2B is a schematic flowchart of a screen sharing process according to some embodiments.
Figure 2C:
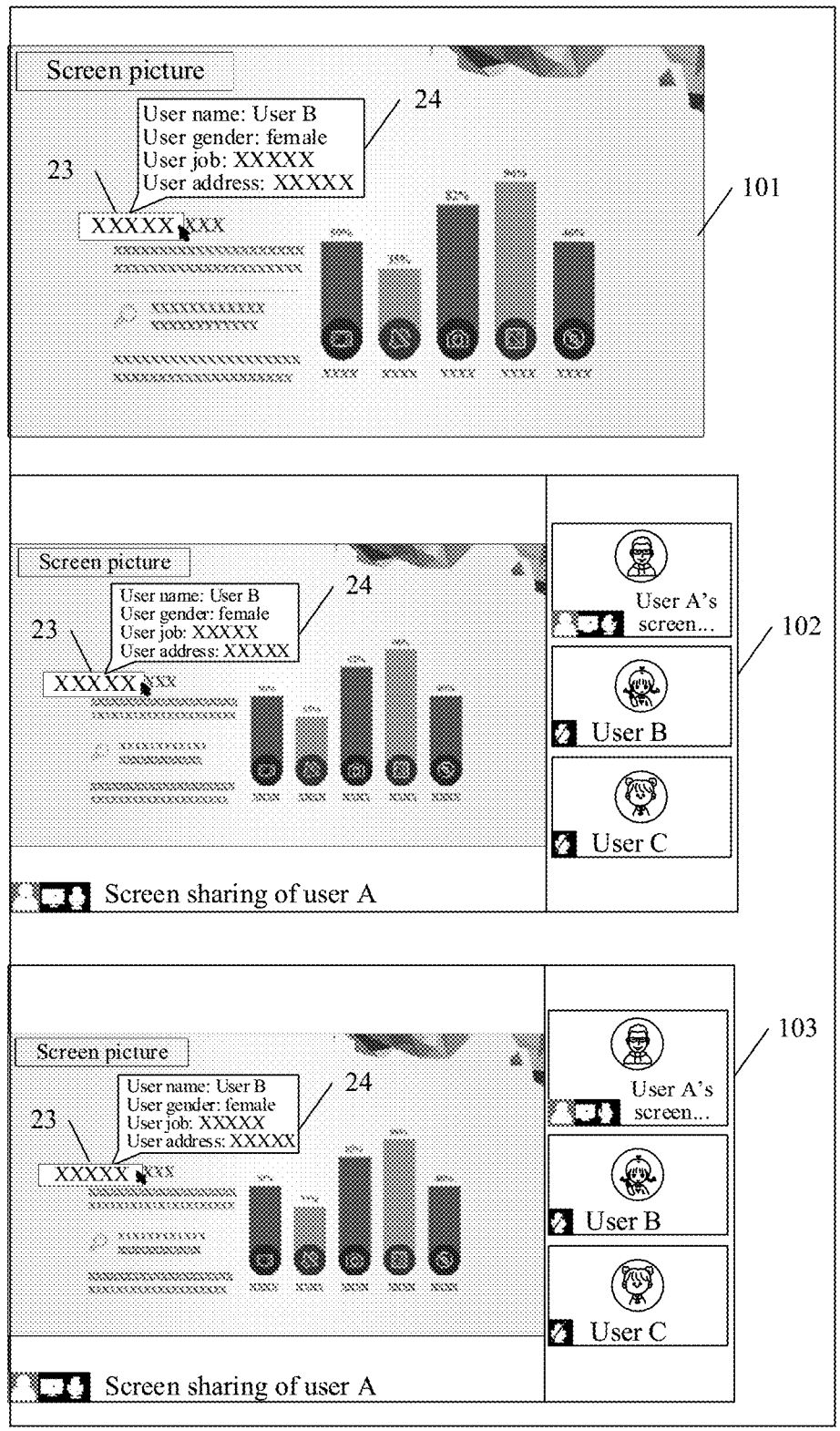
FIG. 2C is a schematic diagram of a screen sharing process according to some embodiments.
Figure 2D:
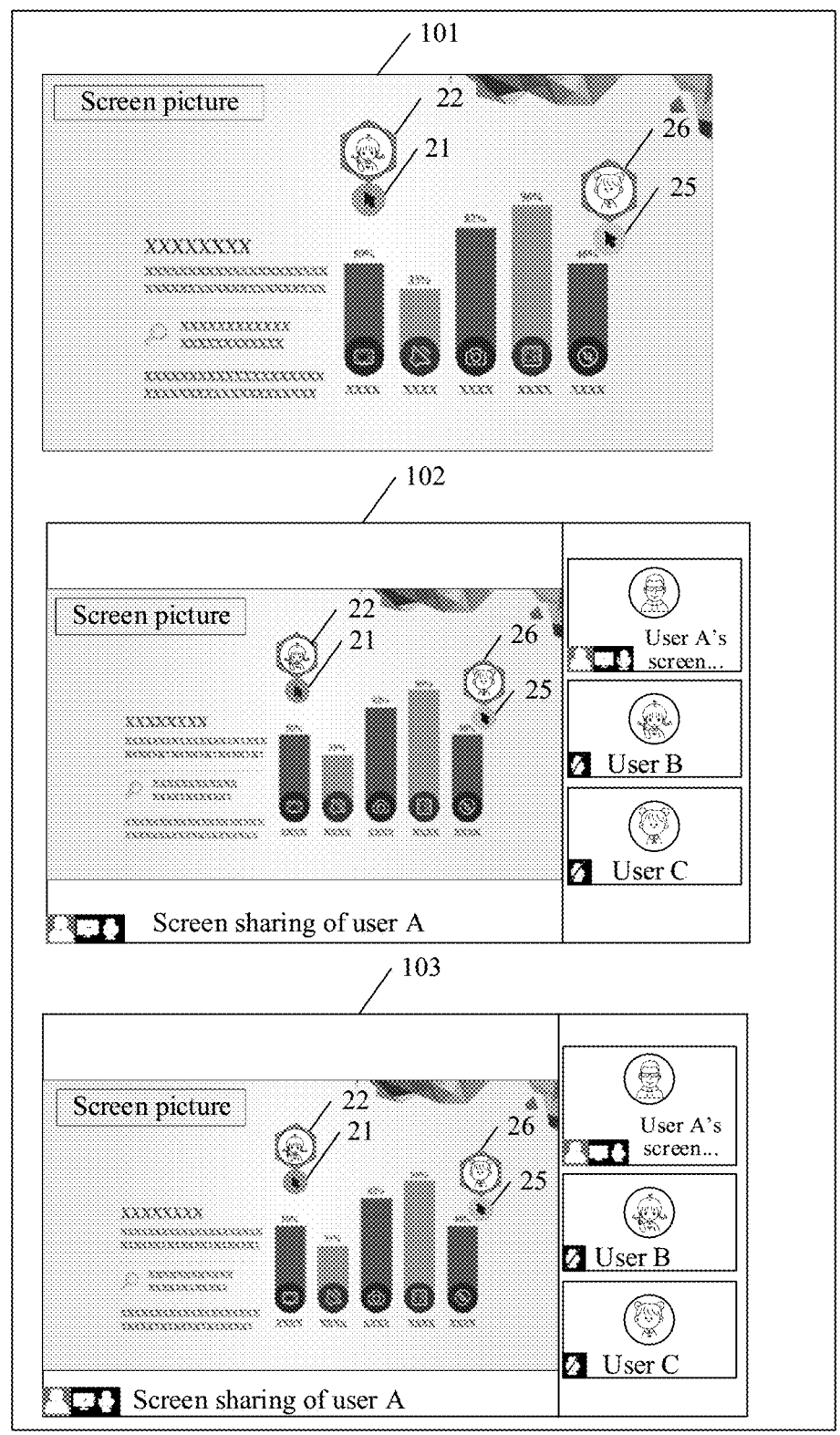
FIG. 2D is a schematic diagram of a screen sharing process according to some embodiments.

An example in which the first terminal 101 performs screen sharing with the second terminal 102 and the third terminal 103 is used. FIG. 2B is a schematic diagram of a screen sharing process according to some embodiments. As shown in FIG. 2B, the target position in the screen picture is triggered by the second terminal 102, and the first terminal 101, the second terminal 102, and the third terminal 103 synchronously display the content at the target position as the first target color (such as a gray circular icon 21 shown in FIG. 2B) in the screen picture, and display attribute information of the terminal user of the second terminal 102 (such as an avatar 22 of the terminal user B of the second terminal 102 shown in FIG. 2B) at the target position. FIG. 2C is a schematic diagram of a screen sharing process according to some embodiments. As shown in FIG. 2C, the target position in the screen picture is triggered by the second terminal 102, and the first terminal 101, the second terminal 102, and the third terminal 103 synchronously magnify and display the content at the target position (such as 23 shown in FIG. 2C) in the screen picture, and display attribute information of the terminal user of the second terminal 102 (such as an attribute box 24 of the second terminal 102 shown in FIG. 2C, where the attribute box of the second terminal 102 includes a user name, gender, a job, and an address of the terminal user B of the second terminal 102) at the target position. FIG. 2D is a schematic diagram of a screen sharing process according to some embodiments. As shown in FIG. 2D, the first target position in the screen picture is triggered by the second terminal 102, the content at the first target position is displayed as the first target color (such as a dark gray circular icon 21 shown in FIG. 2D) in the screen picture of the first terminal, and attribute information of the terminal user of the second terminal 102 (such as an avatar 22 of the terminal user B of the second terminal 102 shown in FIG. 2D) is displayed at the first target position. The second target position in the screen picture is triggered by the third terminal 103, the content at the second target position is displayed as the second target color (such as a light gray circular icon 25 shown in FIG. 2D) in the screen picture of the first terminal 101, and attribute information of the terminal user of the third terminal 103 (such as an avatar 26 of the terminal user C of the third terminal 103 shown in FIG. 2D) is displayed at the second target position.

In this embodiment, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect. By highlighting the target position in the screen picture, the terminals participating in the social session can intuitively check the triggered target position in the screen picture, thereby realizing effective interaction in the screen sharing process, and having a better screen sharing effect among the terminals. Moreover, manners of highlighting the triggered target position in the screen picture are flexible and various (for example, content at the target position is displayed as a designated color, the content at the target position is displayed as designated brightness, attribute information of a trigger is displayed at the target position, the content at the target position is magnified and displayed, and a designated icon is displayed at the target position), thereby improving the interactivity of screen sharing among the terminals.

It can be understood that the screen sharing system described in the embodiments of the disclosure is for describing technical solutions more clearly and does not form limits to the technical solutions. It is to be known to those of ordinary skill in the art that, with the evolution of the system architecture and the emerging of new service scenarios, the technical solutions provided in the embodiments are applied equally to similar technical problems.

Figure 3:
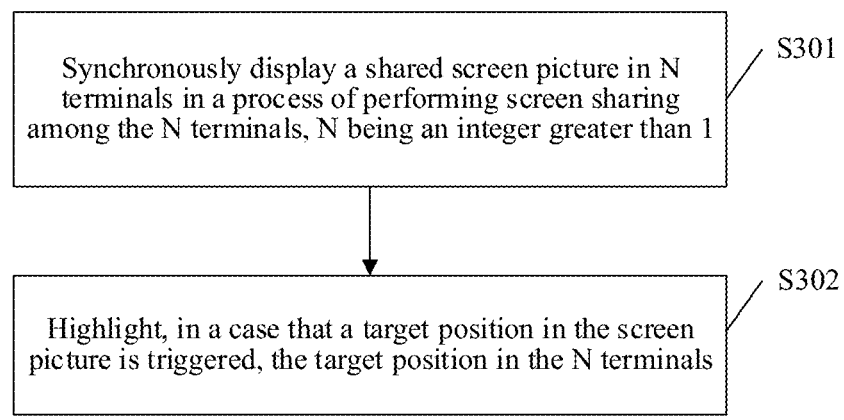
FIG. 3 is a schematic flowchart of a screen sharing method according to some embodiments.

FIG. 3 is a schematic flowchart of a screen sharing method according to some embodiments. The screen sharing method includes the following operation S301 and operation S302.

Operation S301. Synchronously display a shared screen picture in N terminals in a process of performing screen sharing among the N terminals, N being an integer greater than 1.

Specifically, a social session may be performed among the N terminals, for example, the N terminals participate in a same conference for a social session, or the N terminals participate in a same instant messaging group or social group for a social session. During the social session of the N terminals, the N terminals may perform screen sharing. An example in which the first terminal performs screen sharing with other terminals except the first terminal in the N terminals is used. In a process in which the first terminal performs screen sharing with the other terminals except the first terminal in the N terminals, a screen picture of the first terminal is synchronously displayed in the N terminals, and the screen picture of the first terminal is a picture obtained by photographing a screen of the first terminal. The example in which the first terminal performs screen sharing with the other terminals except the first terminal in the N terminals is used for description in some embodiments. In an example application scenario, each of the terminals participating in the social session can initiate screen sharing. For example, the second terminal performs screen sharing with other terminals except the second terminal in the N terminals, the third terminal performs screen sharing with other terminals except the third terminal in the N terminals, or the $N^{th}$ terminal performs screen sharing with other terminals except the $N^{th}$ terminal in the N terminals. That is, any terminal participating in screen sharing can initiate screen sharing. This is not limited thereto.

Operation S302. Highlight, in a case that a target position in the screen picture displayed in any terminal of the N terminals is triggered, the target position in the N terminals, the target position being any position in the screen picture.

Specifically, the target position displayed in the screen picture of the terminals participating in the social session may be triggered. In a case that the target position in the screen picture is triggered, the terminals participating in the social session highlight the target position in respective screen pictures. The target position herein is any position in the shared screen picture displayed in any terminal of the N terminals. In an implementation, each of the terminals participating in the social session may trigger the shared screen picture. For example, the first terminal may trigger the shared screen picture, or the second terminal may trigger the shared screen picture. This is not limited thereto.

In an implementation, any terminal of the N terminals is represented as an $i^{th}$ terminal (such as, a first terminal, a second terminal, a third terminal, or the $i^{th}$ terminal), where i is a positive integer and i≤N. By using an example in which the $i^{th}$ terminal in the N terminals triggers the target position in the shared screen picture, a trigger operation may specifically include the following cases.

(1) In a case that there is a touch signal at the target position in the screen picture displayed in the $i^{th}$ terminal, the target position is triggered. The touch signal may include any one of the following: a finger click, a long press of a finger, or a double click of a finger. The finger click means that a finger touches the target position in the screen picture and then releases it quickly. The long press of the finger means that a time for which the finger presses the target position of the screen picture exceeds a time threshold (for example, one second). The double click of the finger means that the finger touches the target position of the screen picture again and releases it quickly after touching the target position of the screen picture and releasing it quickly. That is, in a case that the target position in the screen picture displayed in the $i^{th}$ terminal is clicked by a terminal user of the $i^{th}$ terminal, the target position in the screen picture is triggered. Alternatively, in a case that the target position in the screen picture displayed in the $i^{th}$ terminal is double-clicked by the terminal user of the $i^{th}$ terminal, the target position in the screen picture is triggered. Alternatively, in a case that the target position in the screen picture displayed in the $i^{th}$ terminal is long pressed by the terminal user of the $i^{th}$ terminal, the target position in the screen picture is triggered.

(2) In a case that a dwell time of a screen pointer in the $i^{th}$ terminal at the target position in the screen picture exceeds a time threshold, the target position is triggered. The screen pointer in the $i^{th}$ terminal may include a mouse of the $i^{th}$ terminal or a cursor of the $i^{th}$ terminal. That is, in a case that the dwell time of the mouse of the $i^{th}$ terminal at the target position in the screen picture exceeds the time threshold, the target position is triggered. Alternatively, in a case that the dwell time of the cursor of the $i^{th}$ terminal at the target position in the screen picture exceeds the time threshold, the target position is triggered.

(3) In a case that the $i^{th}$ terminal receives a speech trigger signal and the speech trigger signal includes indication content for the target position in the screen picture, the target position is triggered. The speech trigger signal is a speech trigger instruction of the terminal user of the $i^{th}$ terminal received by the $i^{th}$ terminal (such as speech content of the terminal user of the $i^{th}$ terminal received by the $i^{th}$ terminal), and the speech trigger instruction includes the indication content for the target position in the screen picture. The $i^{th}$ terminal may obtain the indication content of the target position in the screen picture from the speech trigger instruction through a speech identification technology, and determine the target position corresponding to the indication content in the screen picture according to an image identification technology, so that the target position in the screen picture is triggered. For example, the speech trigger instruction may be "what does a number 35% above a second histogram mean?" The $i^{th}$ terminal may obtain indication content "35%" of the target position in the screen picture from the speech trigger instruction through the speech identification technology, and determine the target position corresponding to the indication content "35%" in the screen picture according to the image identification technology, so that the target position in the screen picture is triggered.

Figure 4:
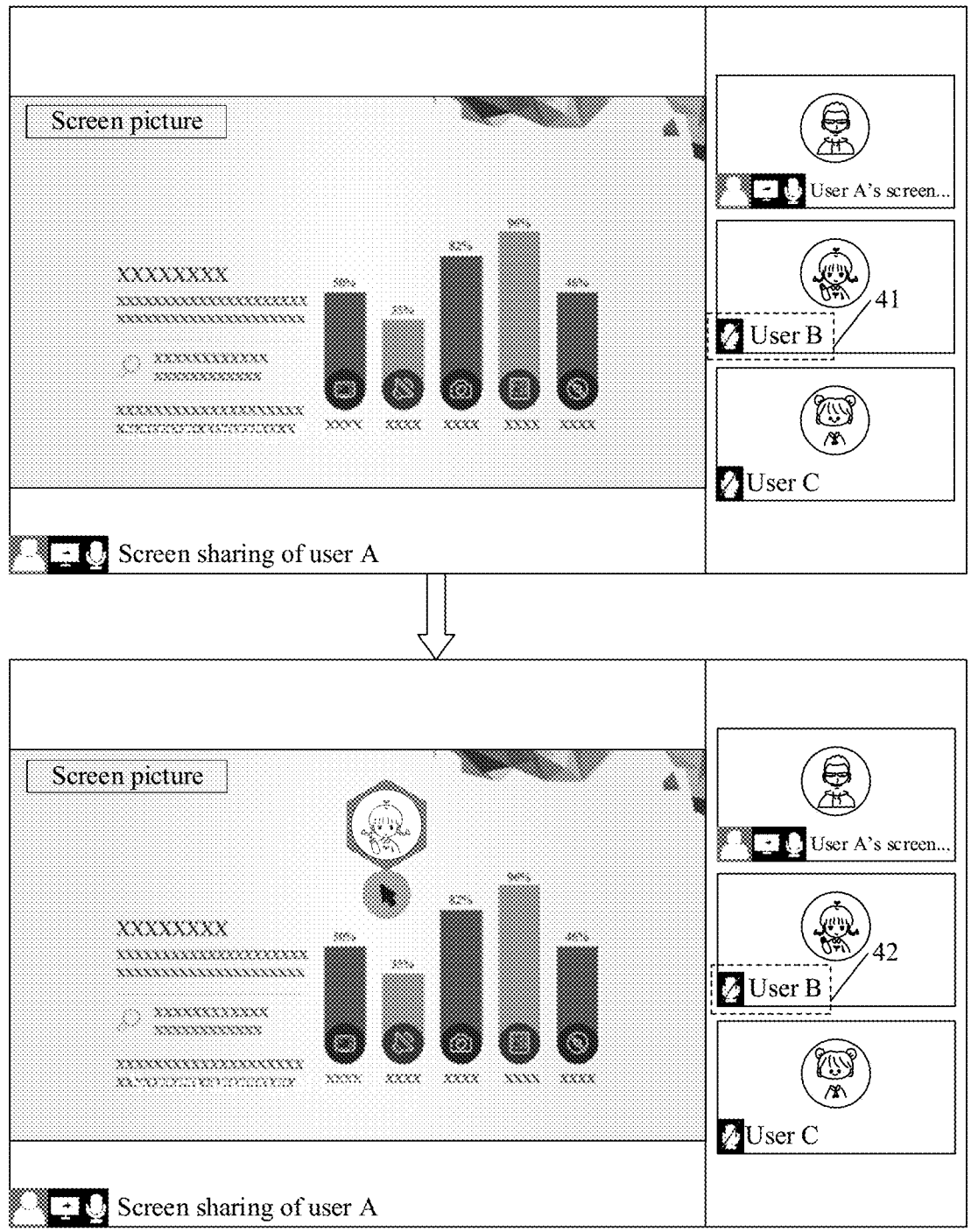
FIG. 4 is a schematic diagram of switching of a use state of a speech control according to some embodiments.

(4) In a process of displaying the screen picture by the $i^{th}$ terminal, in a case that a speech control in the $i^{th}$ terminal is switched from a disabled state to an available state and a screen pointer in the $i^{th}$ terminal is located at the target position in the screen picture, the target position is triggered. The speech control may include a microphone of the $i^{th}$ terminal or the like. FIG. 4 is a schematic diagram of switching of a use state of a speech control according to some embodiments. As shown in FIG. 4, a speech control of the terminal user B is switched from a disabled state 41 to an available state 42. In a case that the speech control of the terminal user B is switched from the disabled state to the available state, a screen pointer in the terminal used by the terminal user B is located at the target position of the screen picture, so that the target position is triggered.

In the above process, by triggering the target position in the screen picture and highlighting the triggered target position in the screen picture, the terminals participating in screen sharing can intuitively check the triggered target position in the screen picture, thereby realizing effective interaction in the screen sharing process, and having a better screen sharing effect among the terminals. Moreover, manners of triggering the target position are flexible and various, thereby meeting trigger requirements for the target position in the screen picture in different application scenarios, and having better user experience.

In some embodiments, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect. In addition, by triggering the target position in the screen picture and highlighting the triggered target position in the screen picture, the terminals participating in screen sharing can intuitively check the triggered target position in the screen picture, thereby realizing effective interaction in the screen sharing process, and having a better screen sharing effect among the terminals. Moreover, manners of triggering the target position are flexible and various (for example, in a case that there is a touch signal at the target position in the screen picture, in a case that a dwell time of a screen pointer at the target position in the screen picture exceeds a time threshold, or in a case that a speech trigger signal is received and a speech control is switched from a disabled state to an available state, the target position in the screen picture is triggered), thereby meeting trigger requirements for the target position in the screen picture in different application scenarios, and having better user experience.

Figure 5:
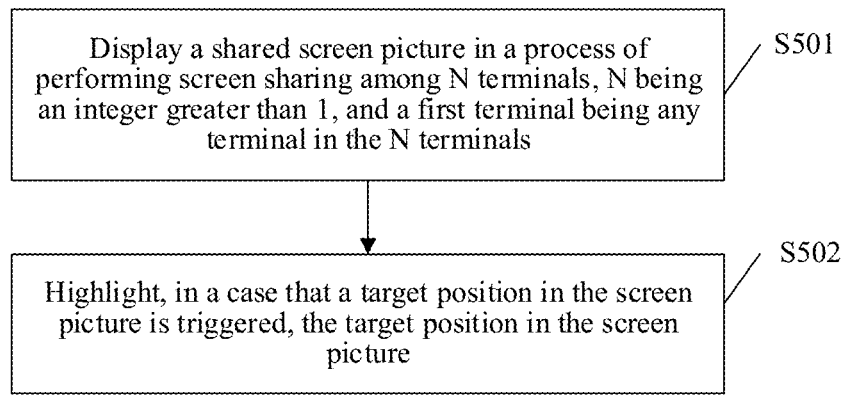
FIG. 5 is a schematic flowchart of a screen sharing method according to some embodiments.

FIG. 5 is a schematic flowchart of a screen sharing method according to some embodiments. The method may be performed by any terminal in the screen sharing system shown in FIG. 1. In this embodiment, an example in which the first terminal 101 performs the screen sharing method is used for description, and an example in which the first terminal 101 performs screen sharing with the second terminal 102 and the third terminal 103 is used for description. In an actual application scenario, there may be N terminals participating in a screen sharing process. The screen sharing method includes the following operation S501 and operation S502.

Operation S501. Display a shared screen picture in a process of performing screen sharing among N terminals, N being an integer greater than 1, a first terminal being any terminal in the N terminals, and the shared screen picture being synchronously displayed in the N terminals.

Specifically, a social session may be performed among the N terminals, for example, the N terminals participate in a same conference for a social session, or the N terminals participate in a same instant messaging group or social group for a social session. During the social session of the N terminals, the N terminals may perform screen sharing. In the process of performing screen sharing among the N terminals, the first terminal displays the shared screen picture, and the shared screen picture displayed in the first terminal may be a screen picture of a terminal in the N terminals that initiates screen sharing. For example, the first terminal performs screen sharing with other terminals except the first terminal in the N terminals, and the shared screen picture displayed in the first terminal is a screen picture of the first terminal; a second terminal performs screen sharing with other terminals except the second terminal in the N terminals, and the shared screen picture displayed in the first terminal is a screen picture of the second terminal; or a third terminal performs screen sharing with other terminals except the third terminal in the N terminals, and the shared screen picture displayed in the first terminal is a screen picture of the third terminal. Any terminal participating in screen sharing may initiate screen sharing. This is not limited thereto.

Operation S502. Highlight, in a case that a target position in the screen picture displayed in any terminal of the N terminals is triggered, the target position in the screen picture of the first terminal, the target position being any position in the screen picture.

Specifically, the target position displayed in the screen picture of the terminals participating in screen sharing may be triggered. The target position herein is any position in the screen picture. In a case that the target position in the screen picture is triggered, the terminals participating in the social session highlight the target position in respective screen pictures.

In an example embodiment, each of the terminals participating in screen sharing may trigger the target position in the shared screen picture. For example, the first terminal may trigger the target position in the shared screen picture, or the second terminal may trigger the target position in the shared screen picture. In a case that different terminals trigger the target position in the screen picture, manners of highlighting the target position are different, and include the following cases.

(1) The target position in the screen picture is triggered by the first terminal, and the first terminal has a host permission. The terminal with the host permission is a terminal with more operation permissions in the screen sharing process, for example, the terminal with the host permission may initiate screen sharing, and the terminal with the host permission may switch between a current screen picture and historical screen pictures in the screen sharing process. A terminal without the host permission is a terminal with less operation permissions in the screen sharing process, for example, the terminal without the host permission cannot initiate screen sharing, and the terminal without the host permission cannot switch between the current screen picture and the historical screen pictures in the screen sharing process. In a case that the target position in the screen picture is triggered by the first terminal and the first terminal has a host permission, the screen picture is a picture obtained by photographing a screen of the first terminal, and the first terminal shares the screen picture after the target position is highlighted with the other terminals except the first terminal in the N terminals for synchronous display.

Figure 6A:
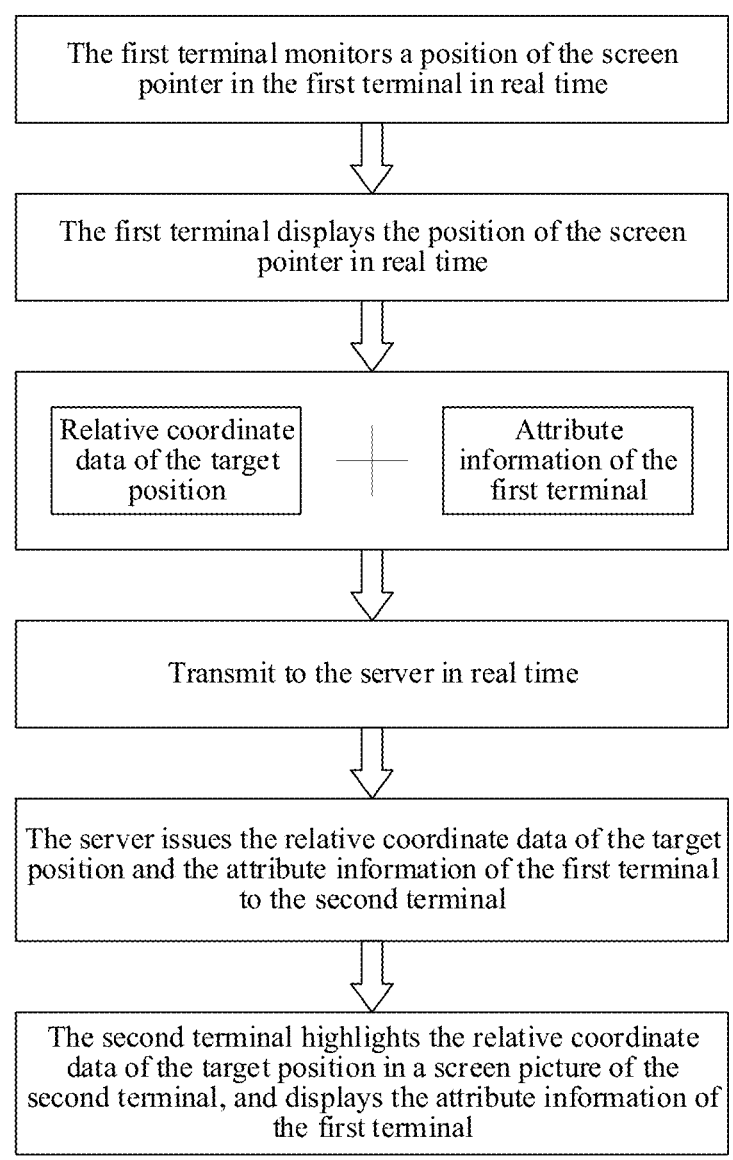
FIG. 6A is a schematic flowchart of a data interaction manner according to some embodiments.
Figure 6B:
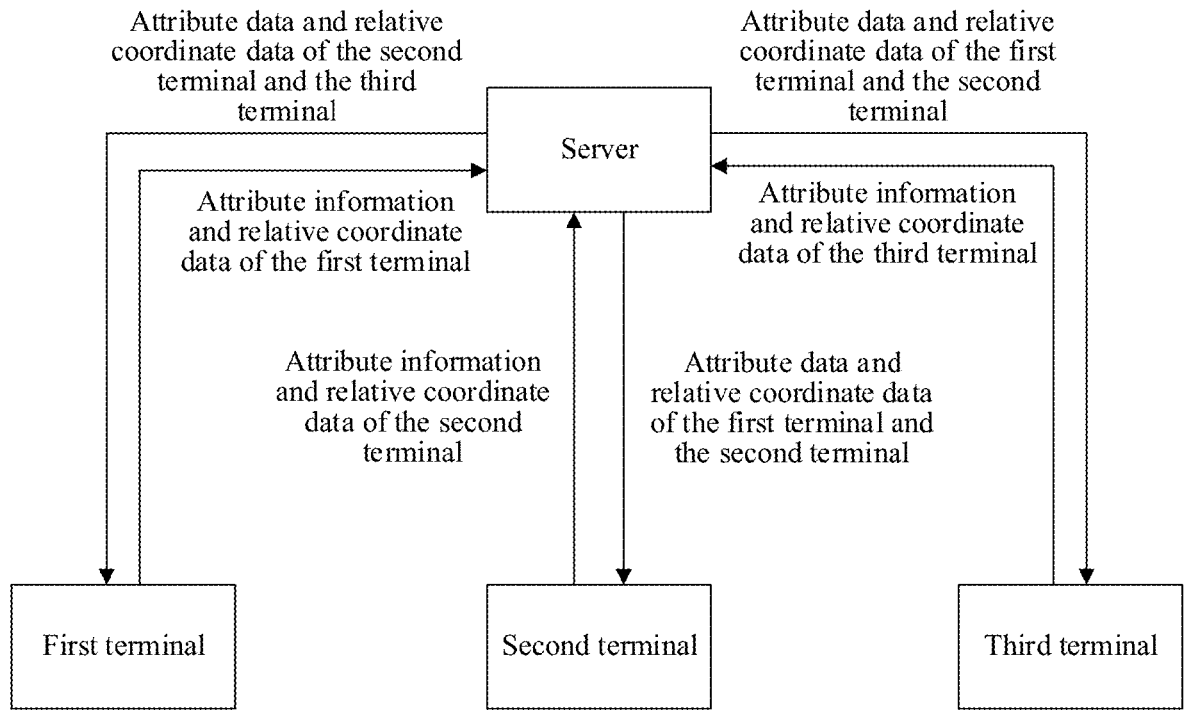
FIG. 6B is a schematic flowchart of a data interaction manner according to some embodiments.
Figure 6C:
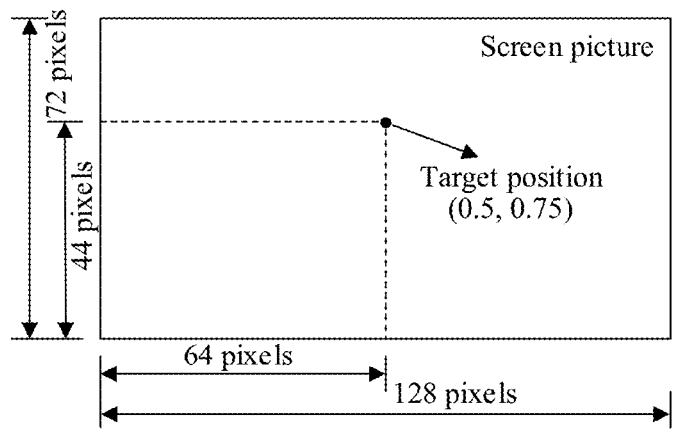
FIG. 6C is a schematic of a method for determining relative coordinate data according to some embodiments.

(2) The target position in the screen picture is triggered by the first terminal, and the first terminal does not have a host permission. In a case that the target position in the screen picture is triggered by the first terminal and the first terminal does not have the host permission, the first terminal may respectively transmit coordinate information of the target position in the screen picture (namely, relative coordinate data of the target position) and attribute information of the first terminal to the other terminals except the first terminal in the N terminals. The other terminals except the first terminal in the N terminals may highlight the target position in respectively displayed screen pictures according to the coordinate information of the target position in the screen picture. In an implementation, the relative coordinate data of the target position triggered by the first terminal and the attribute information of the first terminal may be further transmitted by a server to the other terminals except the first terminal in the N terminals, and a data interaction process is shown in FIG. 6A and FIG. 6B. FIG. 6A is a schematic flowchart of a data interaction manner according to some embodiments. FIG. 6B is a schematic flowchart of a data interaction manner according to some embodiments. In a case that a screen pointer in the first terminal moves in the screen picture, the first terminal monitors a position of the screen pointer in the first terminal in real time, obtains relative coordinate data of the screen pointer, and displays the position of the screen pointer in the screen picture in real time. In a case that the target position in the screen picture is triggered by the first terminal, because the first terminal does not have the host permission, the first terminal transmits the relative coordinate data generated when the first terminal triggers the target position and the attribute information of the first terminal to the server. The server transmits the relative coordinate data generated when the first terminal triggers the target position and the attribute information of the first terminal to the other terminals except the first terminal in the N terminals (by using the second terminal and the third terminal as an example). The other terminals except the first terminal in the N terminals respectively highlight the target position in screen pictures according to the relative coordinate data of the target position and the attribute information of the first terminal. FIG. 6C is a schematic of a method for determining relative coordinate data according to some embodiments. As shown in FIG. 6C, the target position in the screen picture is triggered by the first terminal, the relative coordinate data generated when the first terminal triggers the target position is the coordinate information of the target position, and the coordinate information of the target position is determined according to a side length of a rectangle formed by the target position and the screen picture and a side length of the screen picture. In an example embodiments, the first terminal may also directly transmit the attribute information of the first terminal and the relative coordinate data of the target position triggered by the first terminal to the terminals except the first terminal in the N terminals, without transfer of the server.

Specifically, in a case that the target position in the screen picture is triggered by the first terminal, the first terminal does not have a host permission, and the second terminal has the host permission, the screen picture is a picture obtained by photographing a screen of the second terminal, and the first terminal transmits a position display request to the second terminal, where the position display request is used for indicating to synchronously highlight the target position in the other terminals except the first terminal in the N terminals. In a case that the second terminal agrees to transfer the host permission to the first terminal, the host permission of the second terminal is transferred to the first terminal, the first terminal has the host permission, and the first terminal shares the screen picture after the target position is highlighted with the other terminals except the first terminal in the N terminals for synchronous display. In a case that the second terminal does not agree to transfer the host permission to the first terminal, the first terminal transmits coordinate information of the target position in the screen picture to the second terminal, to cause the second terminal to highlight the target position in the screen picture displayed in the second terminal according to the coordinate information of the target position in the screen picture, and share the screen picture after the target position is highlighted with other terminals except the first terminal and the second terminal in the N terminals for synchronous display.

Figure 6D:
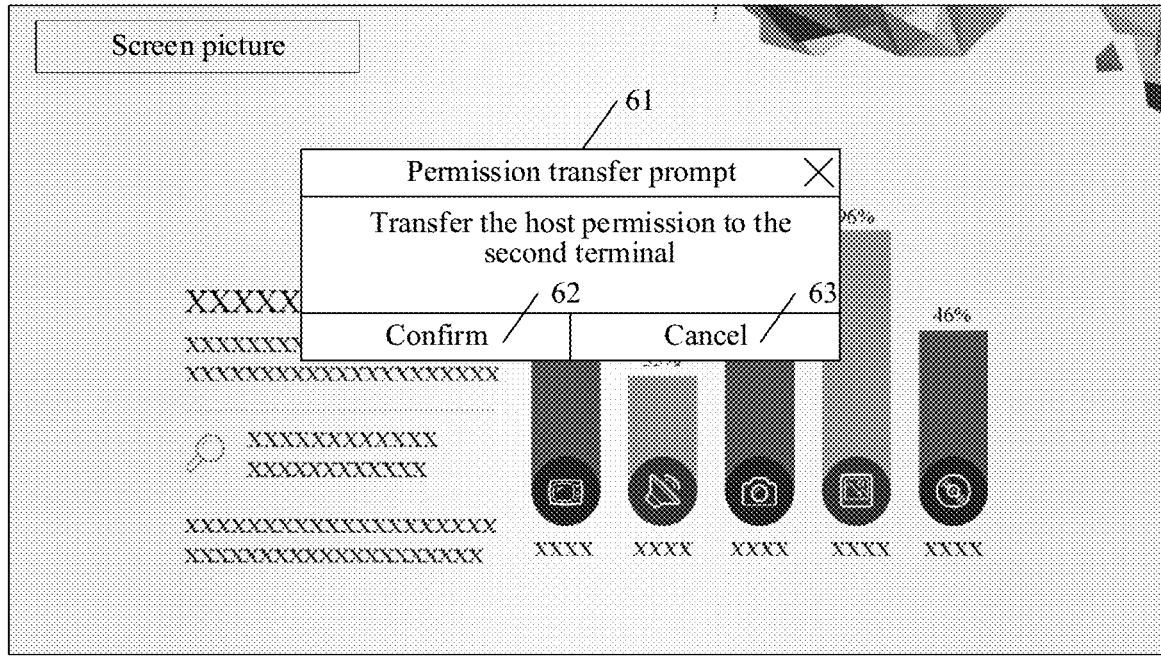
FIG. 6D is a schematic diagram of a permission transfer prompt according to some embodiments.

(3) The target position in the screen picture is triggered by the third terminal, the first terminal has a host permission, and the third terminal does not have the host permission. In a case that the target position in the screen picture is triggered by the third terminal, the first terminal has the host permission, and the third terminal does not have the host permission, the screen picture is a picture obtained by photographing a screen of the first terminal, and the third terminal transmits a position display request to the first terminal. A permission transfer prompt is outputted in a case that the position display request transmitted by the third terminal is received, where the permission transfer prompt is used for prompting that the host permission of the first terminal is to be transferred to the third terminal. FIG. 6D is a schematic diagram of a permission transfer prompt according to some embodiments. In a case that the target position in the screen picture is triggered by the third terminal, the first terminal outputs a permission transfer prompt 61. In a case that the first terminal triggers a confirmation icon 62 in the permission transfer prompt, the permission transfer prompt is confirmed. In a case that the first terminal triggers a cancel icon 63 in the permission transfer prompt, the permission transfer prompt is rejected. In a case that the permission transfer prompt is confirmed by the first terminal (for example, the terminal user of the first terminal clicks the confirmation icon), the host permission of the first terminal is transferred to the third terminal, the third terminal has the host permission, and the first terminal does not have the host permission; the third terminal highlights the target position in a screen picture displayed in the third terminal, and shares the screen picture after the target position is highlighted with the first terminal; and the first terminal receives the screen picture after the target position is highlighted that is shared by the third terminal, and displays the screen picture after the target position is highlighted that is shared by the third terminal. In a case that the permission transfer prompt is rejected by the first terminal (for example, the terminal user of the first terminal clicks the cancel icon), the host permission of the first terminal is not transferred to the third terminal, the first terminal has the host permission, and the third terminal does not have the host permission; the third terminal highlights the target position in a screen picture displayed in the third terminal, and transmits coordinate information of the target position in the screen picture and attribute information of the third terminal to the first terminal; and the first terminal highlights the target position in the screen picture according to the coordinate information of the target position in the screen picture and the attribute information of the third terminal.

In the above process, each of the terminals participating in the social session may trigger the target position in the shared screen picture, and a terminal that initiates screen sharing may trigger the target position in the shared screen picture, so that the triggered target position is highlighted in the screen picture. Any other terminals except the terminal that initiates screen sharing may also trigger the target position in the shared screen picture, so that the triggered target position is highlighted in the screen picture, thereby improving the screen sharing effect.

In an example embodiment, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect. Moreover, each of the terminals participating in the social session may trigger the target position in the shared screen picture, and a terminal that initiates screen sharing may trigger the target position in the shared screen picture, so that the triggered target position is highlighted in the screen picture. Other terminals except the terminal that initiates screen sharing may also trigger the target position in the shared screen picture, so that the triggered target position is highlighted in the screen picture, thereby improving the screen sharing effect. A host permission may be transferred among the terminals participating in the social session, for example, the first terminal transfers the host permission to the second terminal, or the second terminal transfers the host permission to the first terminal. A terminal with the host permission has more operation permissions in the screen sharing process. In this way, flexible and various sharing manners are provided for the terminals participating in screen sharing, thereby meeting the screen sharing requirements.

Figure 7:
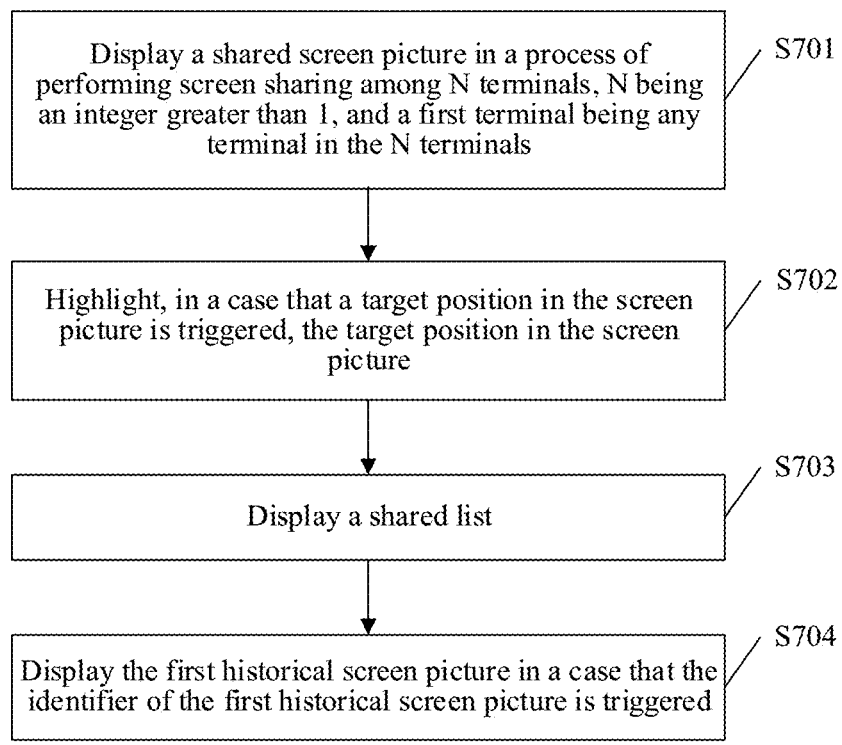
FIG. 7 is a schematic flowchart of a screen sharing method according to some embodiments.

FIG. 7 is a schematic flowchart of a screen sharing method according to some embodiments. The method may be performed by any terminal in the screen sharing system shown in FIG. 1. In this embodiment, an example in which the first terminal 101 performs the screen sharing method is used for description, and an example in which the first terminal 101 performs screen sharing with the second terminal 102 is used for description. In an actual application scenario, there may be N terminals participating in a screen sharing process. The screen sharing method includes the following operation S701 to operation S705.

Operation S701. Display a shared screen picture in a process of performing screen sharing among N terminals, N being an integer greater than 1, a first terminal being any terminal in the N terminals, and the shared screen picture being synchronously displayed in the N terminals.

Operation S702. Highlight, in a case that a target position in the screen picture displayed in any terminal of the N terminals is triggered, the target position in the screen picture of the first terminal, the target position being any position in the screen picture.

In this embodiment, an execution process of operation S701 is the same as an execution process of operation S501 in the embodiment shown in FIG. 5, and an execution process of operation S702 is the same as an execution process of operation S502 in the embodiment shown in FIG. 5. For a specific execution process, reference may be made to specific description of the embodiment shown in FIG. 5. Details are not described herein again.

Operation S703. Display a shared list.

Figure 8A:
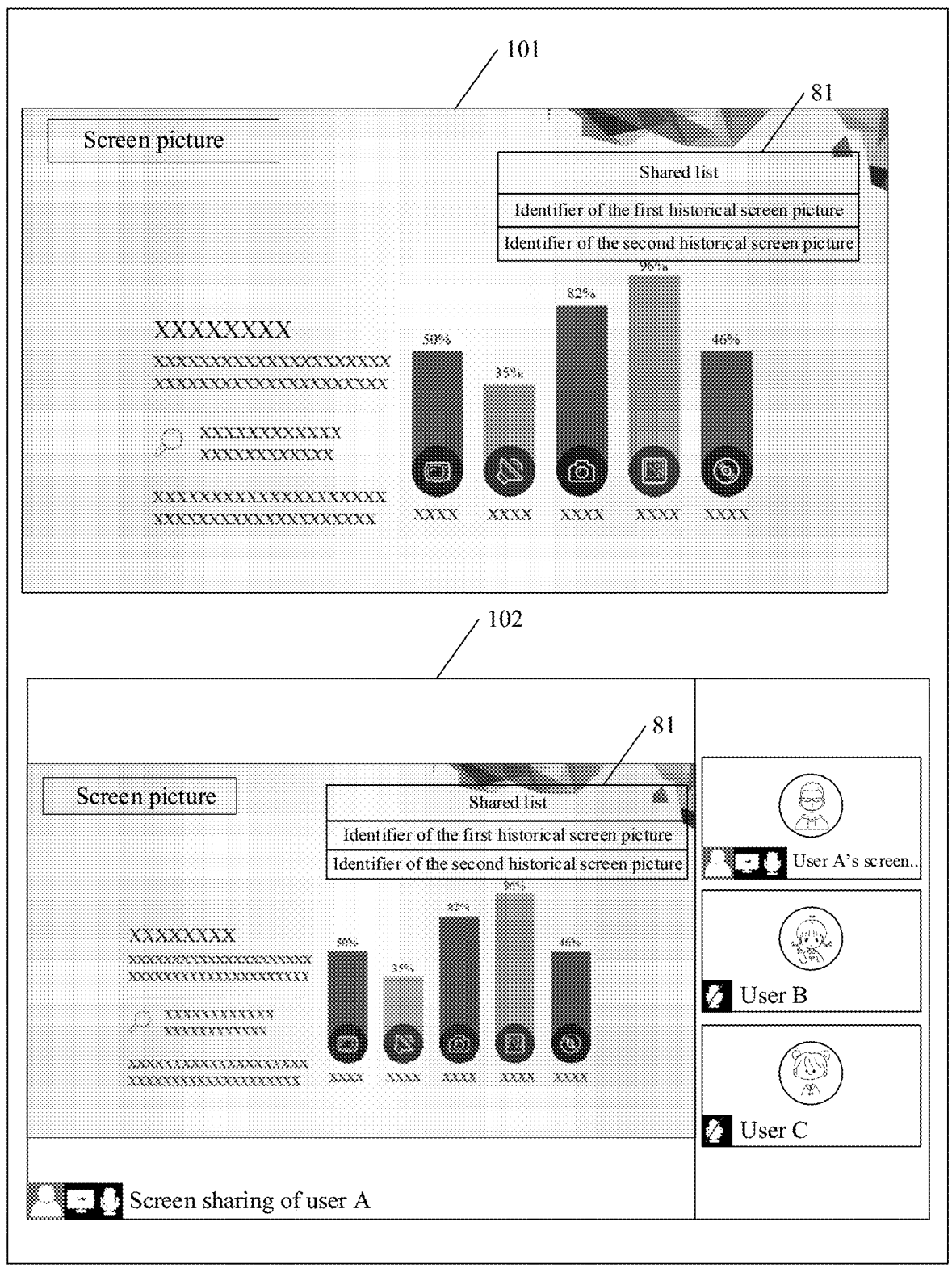
FIG. 8A is a schematic diagram of a shared list according to some embodiments.

In an implementation, the screen picture includes a screen picture that is being shared at a current system time of the first terminal, or includes historical screen pictures that have been shared before the current system time of the first terminal. In the process of performing screen sharing among the N terminals, the shared list is displayed in the shared screen picture, and the shared list may include identifiers of the historical screen pictures that have been shared before the current system time of the first terminal. The current system time is a time displayed by an operating system of a terminal when a terminal user participating in screen sharing checks the shared screen picture. FIG. 8A is a schematic diagram of a shared list according to some embodiments. As shown in FIG. 8A, a shared list 81 is displayed in screen pictures of terminals (by using the first terminal and the second terminal as an example) participating in a social session, the shared list includes the identifiers of the historical screen pictures that have been shared before the current system time of the first terminal, such as "an identifier of a first historical screen picture" and "an identifier of a second historical screen picture". The identifiers of the historical screen pictures that have been shared are automatically updated into the shared list.

Operation S704. Display the first historical screen picture in a case that the identifier of the first historical screen picture is triggered.

In an example embodiment, the identifier of the first historical screen picture may be triggered by any terminal participating in the social session, for example, the identifier of the first historical screen picture may be triggered by the first terminal, or the identifier of the first historical screen picture may also be triggered by the second terminal. In a case that the identifier of the first historical screen picture is triggered, the terminals participating in the social session respectively display the first historical screen picture. In a case that the identifier of the first historical screen picture is triggered by different terminals, display processes of the first historical screen picture are also different, and a specific implementation process includes the following cases.

(1) A trigger operation is performed by the first terminal, the first terminal has a host permission, and the second terminal does not have the host permission. The first terminal displays the first historical screen picture. At the same time, the first terminal shares the first historical screen picture with the second terminal for synchronous display. Similarly, the target position in the first historical screen picture also supports to be triggered. In a case that the target position in the first historical screen picture is triggered, the terminals participating in the social session highlight the target position in the first historical screen picture.

Figure 8B:
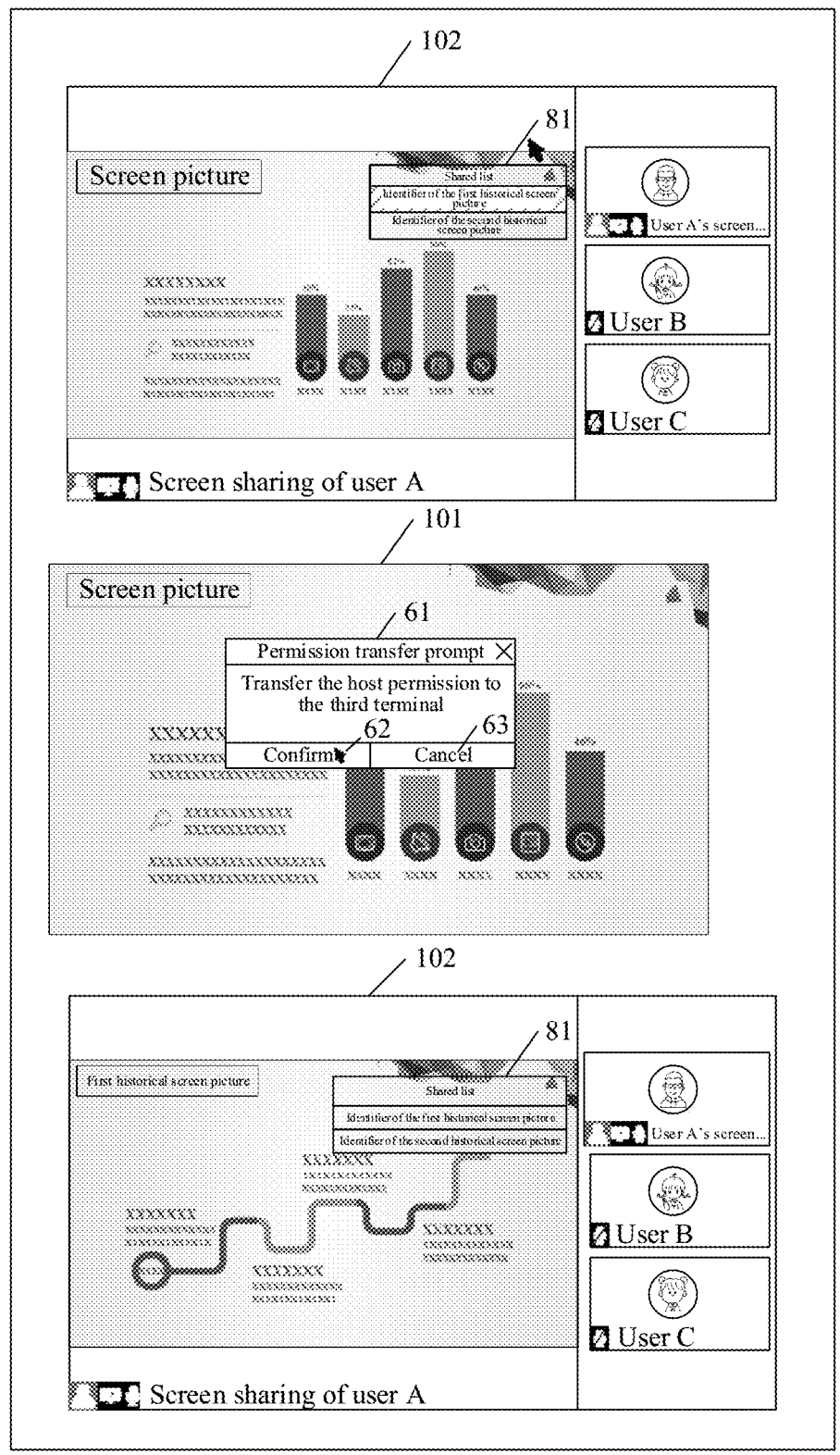
FIG. 8B is a schematic diagram of a switching process of a screen picture according to some embodiments.

(2) A trigger operation is performed by the second terminal, the first terminal has a host permission, and the second terminal does not have the host permission. FIG. 8B is a schematic diagram of a switching process of a screen picture according to some embodiments. As shown in FIG. 8B, the first terminal performs screen sharing with the second terminal. In a case that the identifier of the first historical screen picture in the shared list of the second terminal is triggered by the second terminal, the first terminal outputs a permission transfer prompt 61, where the permission transfer prompt is used for prompting that the host permission of the first terminal is to be transferred to the second terminal. In a case that the permission transfer prompt is confirmed by the first terminal (for example, the terminal user of the first terminal clicks a confirmation icon 62), the host permission of the first terminal is transferred to the second terminal, the first terminal does not have the host permission, and the second terminal has the host permission. The second terminal displays the first historical screen picture. At the same time, the second terminal shares the first historical screen picture with the first terminal for synchronous display. Similarly, the target position in the first historical screen picture also supports to be triggered. In a case that the target position in the first historical screen picture is triggered, the terminals participating in the social session highlight the target position in the first historical screen picture. In a case that the permission transfer prompt is rejected by the first terminal (for example, the terminal user of the first terminal clicks a cancel icon 63), the first terminal rejects to transfer the host permission to the second terminal, the first terminal has the host permission, the second terminal does not have the host permission, and a screen picture switching request of the second terminal is rejected.

In an embodiment, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect. In addition, in the process of performing screen sharing among the N terminals, switching between a screen picture that is being shared at a current system time and historical screen pictures that have been shared before the current system time can also be realized, the switched historical screen pictures also support to be triggered, a triggered position in the historical screen pictures is highlighted, which provide flexible and various screen sharing manners, thereby improving the screen sharing effect.

Figure 9:
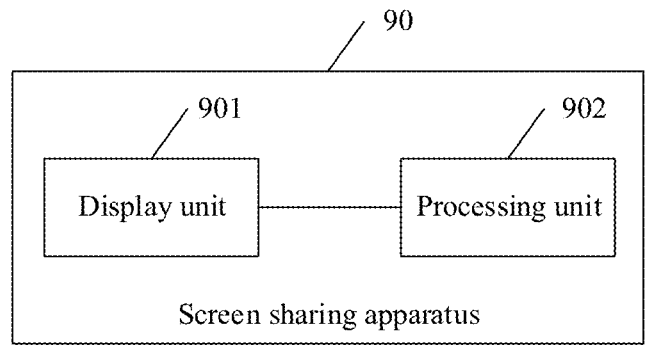
FIG. 9 is a schematic structural diagram of a screen sharing apparatus according to some embodiments.

FIG. 9 is a schematic structural diagram of a screen sharing apparatus according to some embodiments. A screen sharing apparatus 90 may be configured to perform the corresponding operations in the screen sharing method shown in FIG. 3, FIG. 5, or FIG. 7. Referring to FIG. 9, the screen sharing apparatus 90 includes the following units.

a display unit 901, configured to display a shared screen picture in a process of performing screen sharing among N terminals, N being an integer greater than 1, a first terminal being any terminal in the N terminals, and the shared screen picture being synchronously displayed in the N terminals; and a processing unit 902, configured to highlight, in a case that a target position in the screen picture displayed in any terminal of the N terminals is triggered, the target position in a screen picture of the first terminal, the target position being any position in the screen picture.

In an example embodiment, that the target position in the screen picture is triggered may include any one of the following cases:

in a case that there is a touch signal at the target position in the screen picture displayed in any terminal of the N terminals, the target position is triggered;

in a case that a dwell time of a screen pointer in any terminal of the N terminals at the target position in the screen picture exceeds a time threshold, the target position is triggered;

in a case that any terminal of the N terminals receives a speech trigger signal and the speech trigger signal includes indication content for the target position in the screen picture, the target position is triggered; or in a process of displaying the screen picture by any terminal of the N terminals, in a case that a speech control is switched from a disabled state to an available state and a screen pointer is located at the target position in the screen picture, the target position is triggered.

In an example embodiment, the highlighting the target position may include at least one of the following:

displaying content at the target position in the screen picture of the first terminal as a designated color;

displaying content at the target position in the screen picture of the first terminal as designated brightness;

displaying attribute information of a trigger at the target position in the screen picture of the first terminal;

magnifying and displaying content at the target position in the screen picture of the first terminal; or displaying a designated icon at the target position in the screen picture of the first terminal, where the trigger is a user corresponding to the terminal that triggers the target position; and the attribute information of the trigger includes at least one of the following: an avatar, a user name, gender, a job, and an address of the user.

In an example embodiment, the first terminal has a host permission, and the screen picture is a picture obtained by photographing a screen of the first terminal; the target position in the screen picture is triggered by the first terminal; and the processing unit 902 is further configured to share the screen picture after the target position is highlighted with other terminals except the first terminal in the N terminals for synchronous display.

In an example embodiment, the first terminal does not have the host permission; the target position in the screen picture is triggered by the first terminal; and the processing unit 902 may be further configured to respectively transmit coordinate information of the target position in the screen picture to other terminals except the first terminal in the N terminals, to cause the other terminals to highlight the target position in respectively displayed screen pictures according to the coordinate information of the target position in the screen picture.

In an example embodiment, the N terminals further include a second terminal, and the second terminal is any terminal except the first terminal in the N terminals; the first terminal does not have a host permission, the second terminal has the host permission, and the screen picture is a picture obtained by photographing a screen of the second terminal; the target position in the screen picture is triggered by the first terminal; and the processing unit 902 may be further configured to:

transmit a position display request to the second terminal, where the position display request is used for indicating to synchronously highlight the target position in other terminals except the first terminal in the N terminals;

share, in a case that the second terminal agrees to transfer the host permission to the first terminal, the screen picture after the target position is highlighted with the other terminals except the first terminal in the N terminals for synchronous display; or transmit, in a case that the second terminal does not agree to transfer the host permission to the first terminal, coordinate information of the target position in the screen picture to the second terminal, to cause the second terminal to highlight the target position in the screen picture displayed in the second terminal according to the coordinate information of the target position in the screen picture, and share the screen picture after the target position is highlighted with other terminals except the first terminal and the second terminal in the N terminals for synchronous display.

In an example embodiments, the N terminals may further include a third terminal, and the third terminal is any terminal except the first terminal in the N terminals; the first terminal has a host permission, the third terminal does not have the host permission, and the screen picture is a picture obtained by photographing a screen of the first terminal; the target position in the screen picture is triggered by the third terminal; and the processing unit 902 may be further configured to:

output a permission transfer prompt in a case that a position display request transmitted by the third terminal is received, where the permission transfer prompt is used for prompting that the host permission of the first terminal is to be transferred to the third terminal; and display, in a case that the permission transfer prompt is confirmed, the screen picture after the target position is highlighted that is shared by the third terminal.

In an example embodiment, the processing unit 902 may be further configured to receive, in a case that the permission transfer prompt is rejected, coordinate information of the target position in the screen picture that is transmitted by the third terminal, and highlight the target position in the screen picture according to the coordinate information of the target position in the screen picture.

In an example embodiment, the screen picture may include a screen picture that is being shared at a current system time of the first terminal, or includes historical screen pictures that have been shared before the current system time of the first terminal; and the processing unit 902 may be further configured to:

display a shared list in the screen picture of the first terminal, wherein the shared list comprises identifiers of the historical screen pictures that have been shared before the current system time of the first terminal; and the shared list is synchronously displayed in the N terminals; and display, in a case that an identifier of a first historical screen picture in the shared list displayed in any terminal of the N terminals is triggered, the first historical screen picture in the first terminal, wherein the first historical screen picture is synchronously displayed in the N terminals.

According to an embodiment of the disclosure, the units of the screen sharing apparatus 90 shown in FIG. 9 may be implemented entirely or partly by hardware, software (i.e., code), or a combination thereof. Additionally, the units may be separately or wholly combined into one or several other units, or one (or more) of the units herein may further be divided into a plurality of units of smaller functions. In this way, same operations may be implemented, and the implementation of the technical effects of the embodiments is not affected. The foregoing units are divided based on logical functions. In example embodiments, a function of one unit may also be implemented by multiple units, or functions of multiple units are implemented by one unit. In other embodiments, the screen sharing apparatus 90 may also include another unit. These functions may also be cooperatively implemented by another unit and may be cooperatively implemented by multiple units. According to another embodiment, a computer program (including program code) that can perform the operations in the corresponding method shown in FIG. 3, FIG. 5, or FIG. 7 may be run on a general computing device, such as a general computer, which includes processing elements and storage elements such as a central processing unit (CPU), a random access memory (RAM), and a read-only memory (ROM), to construct the screen sharing apparatus 90 shown in FIG. 9 and implement the screen sharing method in the foregoing embodiments. The computer program may be recorded in, for example, a computer-readable storage medium, and may be loaded into and run on any terminal of N terminals by using the computer-readable storage medium.

In some embodiments, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect.

Figure 10:
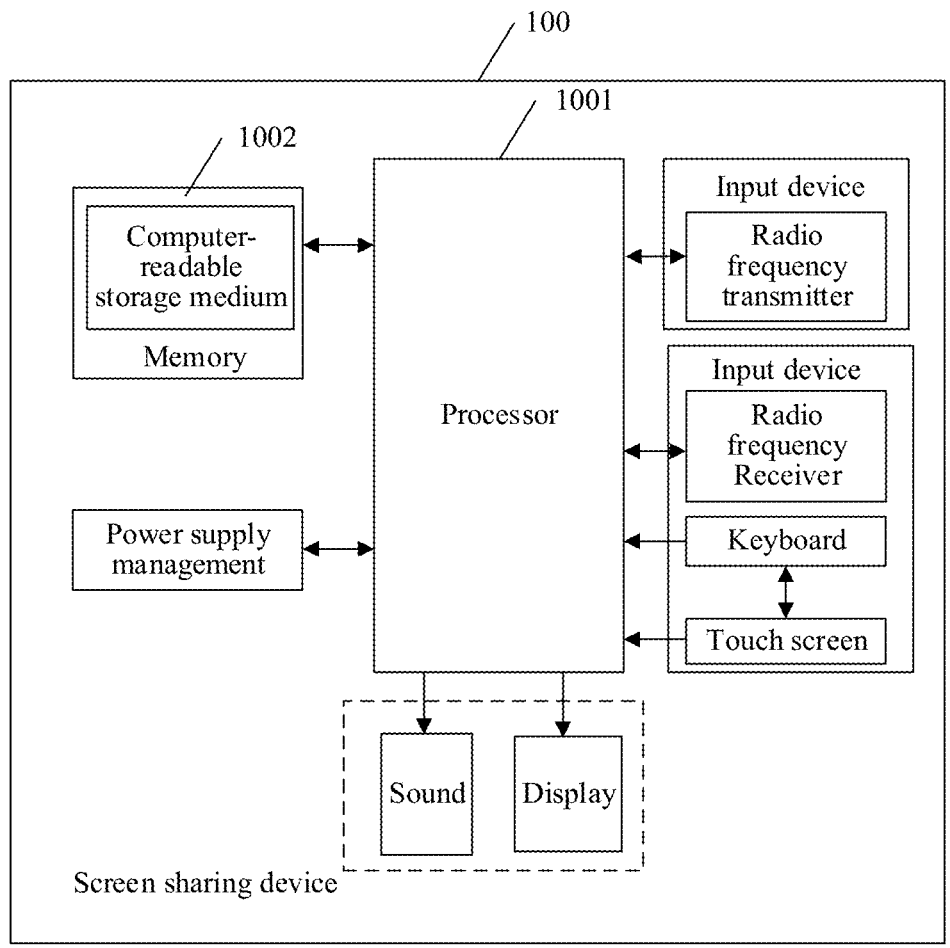
FIG. 10 is a schematic structural diagram of a screen sharing device according to some embodiments.

FIG. 10 is a schematic structural diagram of a screen sharing device according to some embodiments. A screen sharing device 100 at least includes a processor 1001 and a computer-readable storage medium 1002. The processor 1001 may be connected with the computer-readable storage medium 1002 through a bus or other manners. The computer-readable storage medium 1002 may be stored in a memory. The computer-readable storage medium 1002 is configured to store a computer program. The computer program includes computer instructions. The processor 1001 is configured to execute the computer instructions stored in the computer-readable storage medium 1002. The processor 1001 (or referred to as a central processing unit (CPU)) is a computing core and a control core of the screen sharing device 100, is suitable for implementing one or more computer instructions, and is specifically suitable for loading and executing the one or more computer instructions to implement a corresponding method procedure or a corresponding function.

An embodiment of the disclosure may further provide a computer-readable storage medium, and the computer-readable storage medium is a memory device in a screen sharing device 100 and is configured to store programs and data. It may be understood that the computer-readable storage medium 1002 herein may include an internal storage medium of the screen sharing device 100 and certainly may also include an extended storage medium supported by the screen sharing device 100. The computer-readable storage medium provides storage space, and the storage space stores an operating system of the screen sharing device 100. Moreover, computer instructions suitable for the processor 1001 to load and execute is further stored in the memory space. The computer instructions may be one or more computer programs (including program codes). The computer-readable storage medium 1002 herein may be a high-speed RAM, or a non-volatile or non-transitory memory, such as at least one disk memory, or at least one computer-readable storage medium away from the processor 1001.

The screen sharing device 100 may be any terminal shown in FIG. 1, for example, the screen sharing device 100 may be the first terminal 101. The computer-readable storage medium 1002 stores one or more computer instructions. The processor 1001 loads and executes the one or more computer instructions stored in the computer-readable storage medium 1002, to implement corresponding operations of the embodiments of the above screen sharing method. During specific implementation, the one or more computer instructions in the computer-readable storage medium 1002 are loaded by the processor 1001 to perform the following operations:

displaying a shared screen picture in a process of performing screen sharing among N terminals, N being an integer greater than 1, the first terminal being any terminal in the N terminals, and the shared screen picture being synchronously displayed in the N terminals; and highlighting, in a case that a target position in the screen picture displayed in any terminal of the N terminals is triggered, the target position in a screen picture of the first terminal, the target position being any position in the screen picture.

In some embodiments, a shared screen picture is synchronously displayed in N terminals in a process of performing screen sharing among the N terminals, where N is an integer greater than 1; and in a case that a target position in the screen picture is triggered, the target position is highlighted in the N terminals. In the above screen sharing process, in a case that the target position in the screen picture displayed in any terminal of the N terminals is triggered, the triggered target position is highlighted in the N terminals. By highlighting the triggered target position in the shared screen picture, effective communication and multi-party interaction are realized in the process of performing screen sharing among the N terminals, thereby improving the screen sharing effect.

According to an aspect of the disclosure, a computer program product or a computer program is provided, the computer program product or the computer program including computer instructions, the computer instructions being stored in a computer-readable storage medium. A processor of a computer device reads the computer instructions from the computer-readable storage medium and executes the computer instruction, to cause the computer device to perform the screen sharing method in the above various manners.

Although preferable embodiments of the disclosure have been described, once persons skilled in the technology know a basic creative concept, they can make other changes and modifications to these embodiments. Therefore, the following claims are intended to be construed as to cover the exemplary embodiments and all changes and modifications falling within the scope of the disclosure.

Of course, a person skilled in the art can make various modifications and variations to the disclosure without departing from the spirit and scope of the disclosure. In this case, if the modifications and variations made to the disclosure fall within the scope of the claims of the disclosure and their equivalent technologies, the disclosure is intended to include these modifications and variations.

What is claimed is:

1. A screen sharing method, performed by a first terminal, the method comprising:

displaying a shared screen picture in a process of performing screen sharing among N terminals, N being an integer greater than 1, the first terminal being a terminal in the N terminals, and the shared screen picture being synchronously displayed in the N terminals;

highlighting, in a case that a target position in the screen picture displayed in a terminal of the N terminals is triggered, the target position in a screen picture of the first terminal, the target position being a position in the screen picture, wherein the highlighting comprises changing at least one of brightness, color, content format, font, icon and magnification; and respectively transmitting coordinate information of the target position in the screen picture to other terminals except the first terminal in the N terminals, to cause the other terminals to highlight the target position in respectively displayed screen pictures according to the coordinate information of the target position in the screen picture, wherein the first terminal does not have a host permission, and wherein the target position in the screen picture is triggered by the first terminal.

2. The screen sharing method according to claim 1, wherein the screen picture is a picture obtained by photographing a screen of the first terminal;

the target position in the screen picture is triggered by the first terminal; and the method further comprises:

sharing the screen picture after the target position is highlighted with other terminals except the first terminal in the N terminals for synchronous display.

3. The screen sharing method according to claim 1, wherein the N terminals further comprise a second terminal, and the second terminal is a terminal except the first terminal in the N terminals;

the second terminal has the host permission, and the screen picture is a picture obtained by photographing a screen of the second terminal;

the target position in the screen picture is triggered by the first terminal; and the method further comprises:

transmitting a position display request to the second terminal, wherein the position display request is used for indicating to synchronously highlight the target position in other terminals except the first terminal in the N terminals;

sharing, in a case that the second terminal agrees to transfer the host permission to the first terminal, the screen picture after the target position is highlighted with the other terminals except the first terminal in the N terminals for synchronous display, transmitting, in a case that the second terminal does not agree to transfer the host permission to the first terminal, coordinate information of the target position in the screen picture to the second terminal, to cause the second terminal to highlight the target position in the screen picture displayed in the second terminal according to the coordinate information of the target position in the screen picture, and share the screen picture after the target position is highlighted with other terminals except the first terminal and the second terminal in the N terminals for synchronous display.

4. The screen sharing method according to claim 1, wherein the N terminals further comprise a second terminal and a third terminal, and the second terminal is a terminal except the first terminal in the N terminals, and the third terminal is a terminal except the first terminal in the N terminals;

the second terminal has a host permission, the third terminal does not have the host permission, and the screen picture is a picture obtained by photographing a screen of the second terminal;

the target position in the screen picture is triggered by the third terminal;

and the method further comprises:

outputting a permission transfer prompt in a case that a position display request transmitted by the third terminal is received, wherein the permission transfer prompt is used for prompting that the host permission of the second terminal is to be transferred to the third terminal; and in a case that the permission transfer prompt is confirmed, the highlighting the target position in the screen picture comprises: displaying the screen picture after the target position is highlighted that is shared by the third terminal.

5. The screen sharing method according to claim 4, wherein in a case that the permission transfer prompt is rejected, the highlighting the target position in the screen picture comprises: receiving coordinate information of the target position in the screen picture that is transmitted by the third terminal, and highlighting the target position in the screen picture according to the coordinate information of the target position in the screen picture.

6. The screen sharing method according to claim 1, wherein the screen picture comprises a screen picture that is being shared at a current system time of the first terminal, or comprises historical screen pictures that have been shared before the current system time of the first terminal; and the method further comprises: displaying a shared list in the screen picture of the first terminal, wherein the shared list comprises identifiers of the historical screen pictures that have been shared before the current system time of the first terminal; and the shared list is synchronously displayed in the N terminals; and displaying, in a case that an identifier of a first historical screen picture in the shared list displayed in a terminal of the N terminals is triggered, the first historical screen picture in the first terminal, wherein the first historical screen picture is synchronously displayed in the N terminals.

7. The screen sharing method according to claim 1, wherein that the target position in the screen picture displayed in a terminal of the N terminals is triggered comprises any one of the following cases:

in a case that there is a touch signal at the target position in the screen picture displayed in a terminal of the N terminals, the target position is triggered;

in a case that a dwell time of a screen pointer in a terminal of the N terminals at the target position in the screen picture exceeds a time threshold, the target position is triggered;

in a case that a terminal of the N terminals receives a speech trigger signal and the speech trigger signal comprises indication content for the target position in the screen picture, the target position is triggered; or in a process of displaying the screen picture by a terminal of the N terminals, in a case that a speech control in the terminal is switched from a disabled state to an available state and a screen pointer in the terminal is located at the target position in the screen picture, the target position is triggered.

8. The screen sharing method according to claim 1, wherein the highlighting the target position in a screen picture of the first terminal comprises at least one of the following:
displaying content at the target position in the screen picture of the first terminal as a designated color;
displaying content at the target position in the screen picture of the first terminal as designated brightness;
displaying attribute information of a trigger at the target position in the screen picture of the first terminal;
magnifying and displaying content at the target position in the screen picture of the first terminal; or
displaying a designated icon at the target position in the screen picture of the first terminal, wherein
the trigger is a user corresponding to the terminal that triggers the target position; and the attribute information of the trigger comprises at least one of the following: an avatar, a user name, gender, a job, and an address of the user.

9. A screen sharing system, comprising:
at least one memory configured to store program code; and
at least one processor configured to read the program code and operate as instructed by the program code, the program code comprising:
display code configured to cause the at least one processor to display a shared screen picture in a process of performing screen sharing among N terminals, N being an integer greater than 1 and the shared screen picture being synchronously displayed in the N terminals; and
processing code configured to cause the at least one processor to:
highlight, in a case that a target position in the screen picture displayed in a terminal of the N terminals is triggered, the target position in a screen picture of a first terminal, the target position being a position in the screen picture and the terminal and the first terminal being different terminals, wherein the highlight comprises changing at least one of brightness, color, content format, font, icon and magnification; and
respectively transmit coordinate information of the target position in the screen picture to other terminals except the first terminal in the N terminals, to cause the other terminals to highlight the target position in respectively displayed screen pictures according to the coordinate information of the target position in the screen picture,
wherein the first terminal does not have a host permission, and
wherein the target position in the screen picture is triggered by the first terminal.

10. The screen sharing system according to claim 9, wherein the N terminals further comprise a second terminal and a third terminal, and the second terminal is a terminal except the first terminal in the N terminals, and the third terminal is a terminal except the first terminal in the N terminals;
wherein the second terminal has a host permission, and the screen picture is a picture obtained by photographing a screen of the second terminal;
the target position in the screen picture is triggered by the second terminal; and
the processing code is further configured to cause the at least one processor to:
share the screen picture after the target position is highlighted with other terminals except the second terminal in the N terminals for synchronous display.

11. The screen sharing system according to claim 9, wherein the N terminals further comprise a second terminal, and the second terminal is a terminal except the first terminal in the N terminals;
the second terminal has the host permission, and the screen picture is a picture obtained by photographing a screen of the second terminal;
the target position in the screen picture is triggered by the first terminal; and
the processing code is further configured to cause the at least one processor to:
transmit a position display request to the second terminal, wherein the position display request is used for indicating to synchronously highlight the target position in other terminals except the first terminal in the N terminals;
share, in a case that the second terminal agrees to transfer the host permission to the first terminal, the screen picture after the target position is highlighted with the other terminals except the first terminal in the N terminals for synchronous display,
transmit, in a case that the second terminal does not agree to transfer the host permission to the first terminal, coordinate information of the target position in the screen picture to the second terminal, to cause the second terminal to highlight the target position in the screen picture displayed in the second terminal according to the coordinate information of the target position in the screen picture, and share the screen picture after the target position is highlighted with other terminals except the first terminal and the second terminal in the N terminals for synchronous display.

12. The screen sharing system according to claim 9,
wherein the N terminals further comprise a second terminal and a third terminal, and the second terminal is a terminal except the first terminal in the N terminals, and the third terminal is a terminal except the first terminal in the N terminals;
the second terminal has a host permission, the third terminal does not have the host permission, and the screen picture is a picture obtained by photographing a screen of the second terminal;
the target position in the screen picture is triggered by the third terminal; and
the processing code is further configured to cause the at least one processor to:
output a permission transfer prompt in a case that a position display request transmitted by the third terminal is received, wherein the permission transfer prompt is used for prompting that the host permission of the second terminal is to be transferred to the third terminal; and
display, in a case that the permission transfer prompt is confirmed, the screen picture after the target position is highlighted that is shared by the third terminal.

13. The screen sharing system according to claim 12, wherein the processing code is further configured to cause the at least one processor to:
receive, in a case that the permission transfer prompt is rejected, coordinate information of the target position in the screen picture that is transmitted by the third terminal, and highlight the target position in the screen picture according to the coordinate information of the target position in the screen picture.

14. The screen sharing system according to claim 9, wherein the screen picture comprises a screen picture that is being shared at a current system time of the first terminal, or comprises historical screen pictures that have been shared before the current system time of the first terminal; and the processing code is further configured to cause the at least one processor to:
display a shared list in the screen picture of the first terminal, wherein the shared list comprises identifiers of the historical screen pictures that have been shared before the current system time of the first terminal; and the shared list is synchronously displayed in the N terminals; and
display, in a case that an identifier of a first historical screen picture in the shared list displayed in a terminal of the N terminals is triggered, the first historical screen picture in the first terminal, wherein the first historical screen picture is synchronously displayed in the N terminals.

15. The screen sharing system according to claim 10, wherein the in a case that a target position in the screen picture displayed in a terminal of the N terminals is triggered comprises any one of the following cases:
in a case that there is a touch signal at the target position in the screen picture displayed in a terminal of the N terminals, the target position is triggered;
in a case that a dwell time of a screen pointer in a terminal of the N terminals at the target position in the screen picture exceeds a time threshold, the target position is triggered;
in a case that a terminal of the N terminals receives a speech trigger signal and the speech trigger signal comprises indication content for the target position in the screen picture, the target position is triggered; or
in a process of displaying the screen picture by a terminal of the N terminals, in a case that a speech control in the terminal is switched from a disabled state to an available state and a screen pointer in the terminal is located at the target position in the screen picture, the target position is triggered.

16. The screen sharing system according to claim 9, wherein the highlight the target position in a screen picture of the first terminal comprises at least one of the following:
displaying content at the target position in the screen picture of the first terminal as a designated color;
displaying content at the target position in the screen picture of the first terminal as designated brightness;
displaying attribute information of a trigger at the target position in the screen picture of the first terminal;
magnifying and displaying content at the target position in the screen picture of the first terminal; or
displaying a designated icon at the target position in the screen picture of the first terminal, wherein the trigger is a user corresponding to the terminal that triggers the target position; and the attribute information of the trigger comprises at least one of the following: an avatar, a user name, gender, a job, and an address of the user.

17. A non-transitory computer-readable storage medium, storing a computer program that when executed by at least one processor causes the at least one processor to:
display a shared screen picture in a process of performing screen sharing among N terminals, N being an integer greater than 1, the shared screen picture being synchronously displayed in the N terminals; and
highlight, in a case that a target position in the screen picture displayed in a terminal of the N terminals is triggered, the target position in a screen picture of a first terminal in the N terminals, the target position being a position in the screen picture, and the terminal and the first terminal being different terminals, wherein the highlight comprises changing at least one of brightness, color, content format, font, icon and magnification,
respectively transmit coordinate information of the target position in the screen picture to other terminals except the first terminal in the N terminals, to cause the other terminals to highlight the target position in respectively displayed screen pictures according to the coordinate information of the target position in the screen picture,
wherein the first terminal does not have a host permission, and
wherein the target position in the screen picture is triggered by the first terminal.

18. The non-transitory computer-readable storage medium according to claim 17, wherein the N terminals further comprise a second terminal and a third terminal, and the second terminal is a terminal except the first terminal in the N terminals, and the third terminal is a terminal except the first terminal in the N terminals;
the second terminal has a host permission, the third terminal does not have the host permission, and the screen picture is a picture obtained by photographing a screen of the second terminal;
wherein the second terminal has a host permission, and the screen picture is a picture obtained by photographing a screen of the second terminal;
the target position in the screen picture is triggered by the second terminal; and
the computer program is further configured to cause the at least one processor to:
share the screen picture after the target position is highlighted with other terminals except the second terminal in the N terminals for synchronous display.

* * * * *